US012347946B2

(12) United States Patent
Wang et al.

(10) Patent No.: US 12,347,946 B2
(45) Date of Patent: Jul. 1, 2025

(54) ANTENNA AND ELECTRONIC DEVICE

(71) Applicants: Beijing BOE Technology Development Co., Ltd., Beijing (CN); BOE Technology Group Co., Ltd., Beijing (CN)

(72) Inventors: Yali Wang, Beijing (CN); Xichao Fan, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/021,393

(22) PCT Filed: Jun. 21, 2022

(86) PCT No.: PCT/CN2022/100191
§ 371 (c)(1),
(2) Date: Feb. 15, 2023

(87) PCT Pub. No.: WO2023/245435
PCT Pub. Date: Dec. 28, 2023

(65) Prior Publication Data
US 2024/0275052 A1 Aug. 15, 2024

(51) Int. Cl.
*H01Q 1/48* (2006.01)
*H01Q 1/22* (2006.01)
(Continued)

(52) U.S. Cl.
CPC ............. *H01Q 9/0414* (2013.01); *H01Q 1/48* (2013.01); *H01Q 13/106* (2013.01); *H01Q 1/22* (2013.01)

(58) Field of Classification Search
None
See application file for complete search history.

(56) References Cited

U.S. PATENT DOCUMENTS

| | | | | |
|---|---|---|---|---|
| 6,351,239 | B1 | 2/2002 | Mizuno et al. | |
| 2008/0122697 | A1 * | 5/2008 | Mierke | H01Q 9/0414 343/700 MS |

(Continued)

FOREIGN PATENT DOCUMENTS

| | | | |
|---|---|---|---|
| CN | 106876960 | A | 6/2017 |
| CN | 108232434 | A | 6/2018 |

(Continued)

OTHER PUBLICATIONS

Hao-Tao Hu et al., "An SIW-Fed Wideband Filtenna for 5G Millimeter-Wave Communications", IEEE MTT-S IMFW, pp. 53-55, 2021.

(Continued)

*Primary Examiner* — Dameon E Levi
*Assistant Examiner* — Anh N Ho
(74) *Attorney, Agent, or Firm* — Ling Wu; Stephen Yang; Ling and Yang Intellectual Property

(57) ABSTRACT

An antenna includes a first feed layer, a second feed layer and a radiation structure layer stacked; the first feed layer includes a first dielectric substrate and a micro-strip line structure stacked; multiple first conductive patches in a first conductive structure are electrically connected to a reference ground structure through an electrical connection structure on the second dielectric substrate; the reference ground structure is provided with a first slot, multiple first conductive patches are symmetrically arranged with respect to a first centerline, and the first centerline is a centerline of the first slot extending along the second direction; the radiation structure layer includes a third dielectric substrate and a second conductive structure stacked, multiple second conductive patches in the second conductive structure are symmetrically disposed with respect to the first centerline,
(Continued)

any one of the second conductive patches is provided with at least one second slot.

16 Claims, 27 Drawing Sheets

(51) Int. Cl.
*H01Q 9/04* (2006.01)
*H01Q 13/10* (2006.01)

(56) References Cited

U.S. PATENT DOCUMENTS

| | | | | |
|---|---|---|---|---|
| 2020/0212530 | A1* | 7/2020 | Zhu | H01P 1/2088 |
| 2021/0143548 | A1* | 5/2021 | Chivukula | H01Q 1/48 |
| 2021/0399427 | A1* | 12/2021 | Hu | H01Q 9/0457 |
| 2022/0407233 | A1 | 12/2022 | Woo | |

FOREIGN PATENT DOCUMENTS

| | | | |
|---|---|---|---|
| CN | 109244679 | A | 1/2019 |
| CN | 110233333 | A | 9/2019 |
| CN | 112736423 | A | 4/2021 |
| CN | 212968049 | U | 4/2021 |
| CN | 112886235 | A | 6/2021 |
| CN | 113381192 | A | 9/2021 |
| CN | 113690607 | A * | 11/2021 |
| EP | 1983607 | A1 | 10/2008 |
| KR | 10-1533232 | B1 | 7/2015 |
| WO | 2021085669 | A1 | 5/2021 |

OTHER PUBLICATIONS

Wiley, “Antenna Theory Analysis and Design”, Fig14.3(c).

Kang Wang, “Design and Study on Novel Microstrip Differential Filtering Antenna”, May 2021.

Huayan Jin et al., “Differential-fed filtering patch antenna excited by a balun filter”, China Academic Journal Electronic Publishing House, pp. 954-957.

Hao-Tao Hu et al., “Substrate-Integrated-Waveguide-Fed Wideband Filtering Antenna for Millimeter-Wave Applications”, IEEE Transactions on Antennas and Propagation, vol. 69, No. 12, pp. 8125-8135, Dec. 2021.

* cited by examiner

ANTENNA AND ELECTRONIC DEVICE

CROSS-REFERENCE TO RELATED APPLICATION

The present application is a U.S. National Phase Entry of International Application No. PCT/CN2022/100191 having an international filing date of Jun. 21, 2022, the entire content of which is hereby incorporated by reference.

TECHNICAL FIELD

Embodiments of the present disclosure relate to, but are not limited to, the field of communication technologies, and in particular to an antenna, and an electronic device.

BACKGROUND

With the development of Internet of Things era and 5G mobile communication, wireless communication technology and wireless intelligent devices are constantly iteratively updated, which improves people's life quality rapidly. Therefore, the complexity of modern wireless communication systems increases dramatically, and wireless communication systems that can support multi-frequency, multi-standard and multi-mode are needed. As far as the RF front-end of communication system is concerned, the devices and antennas with adjustable frequency and multi-function integrated are mainly studied, which has very important practical significance for the development of wireless communication system.

SUMMARY

The following is a summary of subject matters described herein in detail. The summary is not intended to limit the protection scope of claims.

An embodiment of the present disclosure provides an antenna including a first feed layer, a second feed layer, and a radiation structure layer which are stacked.

The first feed layer includes a first dielectric substrate and a micro-strip line structure which are stacked, wherein the micro-strip line structure is arranged on a side of the first dielectric substrate away from the second feed layer.

The second feed layer includes a reference ground structure, a second dielectric substrate, and a first conductive structure which are stacked, the reference ground structure is arranged on a side of the second dielectric substrate facing the first feed layer, the first conductive structure is arranged on a side of the second dielectric substrate away from the first feed layer, the first conductive structure includes multiple first conductive patches, multiple electrical connection structures are provided on the second dielectric substrate, and the multiple first conductive patches are respectively electrically connected with the reference ground structure through the multiple electrical connection structures; the reference ground structure is provided with a first slot, and in a plane where a feed layer is located, the multiple first conductive patches are symmetrically arranged with respect to a first centerline, wherein the first centerline is a centerline of the first slot extending along a second direction, and a first direction intersects with the second direction.

The radiation structure layer includes a third dielectric substrate and a second conductive structure which are stacked, the second conductive structure is arranged on a side of the third dielectric substrate away from the second feed layer, the second conductive structure includes multiple second conductive patches, in a plane where the antenna is located, the multiple second conductive patches are symmetrically arranged with respect to the first centerline, any one of the second conductive patches is provided with at least one second slot, and second slots on the multiple second conductive patches are symmetrically arranged with respect to the first centerline along a first direction, and a second slot extends to an edge of a side of a second conductive patch close to the first centerline.

In an exemplary embodiment, the number of the first conductive patches in the first conductive structure is two, and the two first conductive patches are arranged along a first direction.

The number of the second conductive patches in the second conductive structure is two, and the two second conductive patches are arranged along the first direction.

In an exemplary embodiment, an orthographic projection of the micro-strip line structure on a plane where the first dielectric substrate is located is at least partially overlapped with orthographic projections of the multiple first conductive patches, the multiple second conductive patches, and the first slot on the first dielectric substrate.

In an exemplary embodiment, the micro-strip line structure is symmetrically arranged along the second direction relative to a second centerline in a plane where the first feed layer is located, and the second centerline is a centerline of the antenna extending along the first direction.

In the plane where the first feed layer is located, the first micro-strip line structure has a size of 6 mm to 10 mm in the first direction, and the first micro-strip line structure has a size of 0.8 mm to 1.4 mm in the second direction.

In an exemplary embodiment, the electric connection structure and a corresponding first conductive patch form an L-shaped probe, in a plane where the second feed layer is located, two L-shaped probes are symmetrically arranged with respect to the first centerline along the first direction, the two L-shaped probes are symmetrically arranged with respect to a second centerline, and the second centerline is a centerline of the antenna extending along the first direction.

In an exemplary embodiment, in a plane where the radiation structure layer is located, the two second conductive patches are symmetrically arranged with respect to a second centerline, and the second centerline is a centerline of the first antenna extending along the first direction.

A second slot on the same second conductive patch is symmetrically arranged along the second direction with respect to the second centerline.

In an exemplary embodiment, the number of the second slots on the same second conductive patch is one to three.

In an exemplary embodiment, any one of the second conductive patches is further provided with a third slot, in a plane where the radiation structure layer is located, the third slot is symmetrically arranged with respect to the second centerline along the second direction, and third slots on the two second conductive patches are symmetrically arranged with respect to the first centerline along the first direction.

The third slot extends to an edge of a side of the second conductive patch away from the first centerline.

In an exemplary embodiment, in the plane where the radiation structure layer is located, the second slot and the third slot each has a size of 1 mm to 2 mm in the first direction and the second slot and the third slot each has a size of 0.1 mm to 0.2 mm in the second direction.

In an exemplary embodiment, on the same second conductive patch, the number of the third slots is one, the number of the second slots is two, and the two second slots are arranged symmetrically with respect to the third slot along the second direction.

In an exemplary embodiment, the first slot is further provided with a branch structure connected to the reference ground structure.

In an exemplary embodiment, branch structures include a first branch structure and a second branch structure; the first branch structure and the second branch structure are arranged along the first direction and are arranged on two sides of the first centerline.

The first branch structure includes a first connection line and a second connection line, wherein the first connection line extends along the first direction, an end of the first connection line away from the first centerline is connected with the reference ground structure, and an end of the first connection line close to the first centerline is connected with the second connection line; a first end of the second connection line is connected with the first connection line, and a second end of the second connection line extends along an opposite direction of the second direction.

The second branch structure includes a third connection line and a fourth connection line, wherein the third connection line extends along the first direction, an end of the first connection line away from the first centerline is connected with the reference ground structure, and an end of the first connection line close to the first centerline is connected with the fourth connection line; and a first end of the fourth connection line is connected with the third connection line, and a second end of the fourth connection line extends along the second direction.

In an exemplary embodiment, the second feed layer further includes a first short-circuit connection structure and a second short-circuit connection structure arranged in the same layer as the first conductive structure, and the second dielectric substrate is further provided with two first short-circuit connection posts and two second short-circuit connection posts.

The first short-circuit connection structure achieves a short-circuit connection with the reference ground structure through the two first short-circuit connection posts, and the second short-circuit connection structure achieves a short-circuit connection with the reference ground structure through the two second short-circuit connection posts.

In an exemplary embodiment, the first short-circuit connection structure and the second short-circuit connection structure are both symmetrically arranged with respect to the first centerline, and the first conductive connection structure and the second conductive connection structure are located on two sides of the first conductive structure along the second direction and are symmetrically arranged with respect to a second centerline, wherein the second centerline is a centerline of the antenna extending along the first direction.

The two first short-circuit connection posts are distributed on two sides of the first slot and are symmetrically arranged with respect to the first centerline, and the two second short-circuit connection posts are distributed on two sides of the first slot and are symmetrically arranged with respect to the first centerline.

Orthographic projections of the first short-circuit connection posts and the second short-circuit connection posts on the first dielectric substrate are not overlapped with orthographic projections of the first slot and the first conductive structure on the first dielectric substrate; orthographic projections of the first short-circuit connection structure and the second short-circuit connection structure on the first dielectric substrate are at least partially overlapped with an orthographic projection of the first slot on the first dielectric substrate.

In an exemplary embodiment, there is no overlapped region between the orthographic projections of the first short-circuit connection structure and the second short-circuit connection structure on the first dielectric substrate and an orthographic projection of the first conductive structure on the first dielectric substrate.

In an exemplary embodiment, shapes of the first short-circuit connection structure and the second short-circuit connection structure include rectangles; or, shapes of the first short-circuit connection structure and the second short-circuit connection structure include an I-shaped structure rotated by 90 degrees.

In an exemplary embodiment, in a plane where the second feed layer is located, a rectangular first short-circuit connection structure and a rectangular second short-circuit connection structure have sizes from 1.5 mm to 2.1 mm in the first direction and from 0.3 mm to 0.7 mm in the second direction.

The I-shaped structure has a size of 1.5 mm to 2.1 mm in the first direction, the I-shaped structure includes two end parts and an intermediate connection part connecting the two end parts, the two end parts of the I-shaped structure have sizes of 0.3 mm to 0.7 mm in the second direction; the intermediate connection part of the I-shaped structure has a size of 0.1 mm to 0.3 mm in the second direction and a size of 0.6 mm to 1 mm in the first direction.

In an exemplary embodiment, any one of the second conductive patches is further provided with a fourth slot, and the number of second slots is one, an end of the second slot away from the first centerline is connected with the fourth slot, the second slot and the fourth slot are both symmetrically arranged with respect to the second centerline, and the second centerline is a centerline of the antenna extending along the first direction.

In an exemplary embodiment, in a plane in which the radiation structure layer is located, the second slot has a size of 0.9 mm to 1.8 mm in the first direction and a size of 0.1 mm to 0.2 mm in the second direction; the fourth slot has a size of 0.1 mm to 0.2 mm in the first direction and a size of 1 mm to 2.1 mm in the second direction.

In an exemplary embodiment, a low frequency cut-off frequency of the antenna is calculated by the following formula:

$$f_{cutoff,lower} \approx \frac{c}{4.5(ll+h)\sqrt{\varepsilon_r}}$$

among them, $f_{cutoff,lower}$ is the low frequency cut-off frequency of the antenna, c is a speed of light, ll is a size of a first conductive patch in the first direction, $\varepsilon_r$ is a dielectric constant of the second dielectric substrate, and h is a thickness of the second dielectric substrate.

In an exemplary embodiment, a high frequency cut-off frequency of the antenna is calculated by the following formula:

$$f_{cutoff,upper} \approx \frac{c}{1.25 l_{s2}\sqrt{\varepsilon_r}}$$

among them, $f_{cutoff,upper}$ is the high frequency cut-off frequency of the antenna, c is a speed of light, $\varepsilon_r$ is a dielectric constant of the second dielectric substrate, and $l_{s2}$ is a size of the first slot in the second direction.

In an exemplary embodiment, in a plane where the antenna is located, a size of the first slot in the second direction is larger than a size of the second conductive structure in the second direction, the size of the second conductive structure in the second direction is larger than a size of the first conductive structure in the second direction, and a size of the second conductive structure in the first direction is larger than a size of the first conductive structure in the first direction.

Orthographic projections of the first conductive structure and the second conductive structure on the first dielectric substrate are not overlapped with an orthographic projection of the first slot on the first dielectric substrate.

In a plane in which the antenna is located, in the first direction, a spacing between two second conductive patches is greater than a spacing between two first conductive patches, and the spacing between the two first conductive patches is greater than or equal to the size of the first slot in the first direction.

In an exemplary embodiment, in a plane where the second feed layer is located, the first slot has a size of 0.4 mm to 0.8 mm in the first direction and a size of 4.5 mm to 6.5 mm in the second direction; a first conductive patch has a size of 1 mm to 2 mm in the first direction and a size of 0.7 mm to 1.1 mm in the second direction; a spacing between the two first conductive patches in the first direction is 0.4 mm to 0.8 mm.

In a plane where the radiation structure layer is located, the second conductive structure has a size of 2 mm to 3.1 mm in the first direction, a size of 3.1 mm to 4 mm in the second direction, and a spacing between the two second conductive patches in the first direction is 0.8 mm to 1.2 mm.

Thicknesses of the first dielectric substrate, the second dielectric substrate and the third dielectric substrate are all 0.2 mm to 0.5 mm, and thicknesses of the reference ground structure, the first conductive structure and the second conductive structure are all 0.01 mm to 0.03 mm.

An embodiment of the present disclosure further provides an electronic device, which includes the antenna of any one of the aforementioned embodiments.

Other aspects may be understood upon reading and understanding the drawings and detailed description.

BRIEF DESCRIPTION OF DRAWINGS

The drawings are intended to provide a further understanding of technical solutions of the present disclosure and form a part of the specification, and are used to explain the technical solutions of the present disclosure together with embodiments of the present disclosure, but not intended to form limitations on the technical solutions of the present disclosure. Shapes and sizes of each component in the drawings do not reflect actual scales, but are only intended to schematically illustrate contents of the present disclosure.

DETAILED DESCRIPTION

Figure 1A:
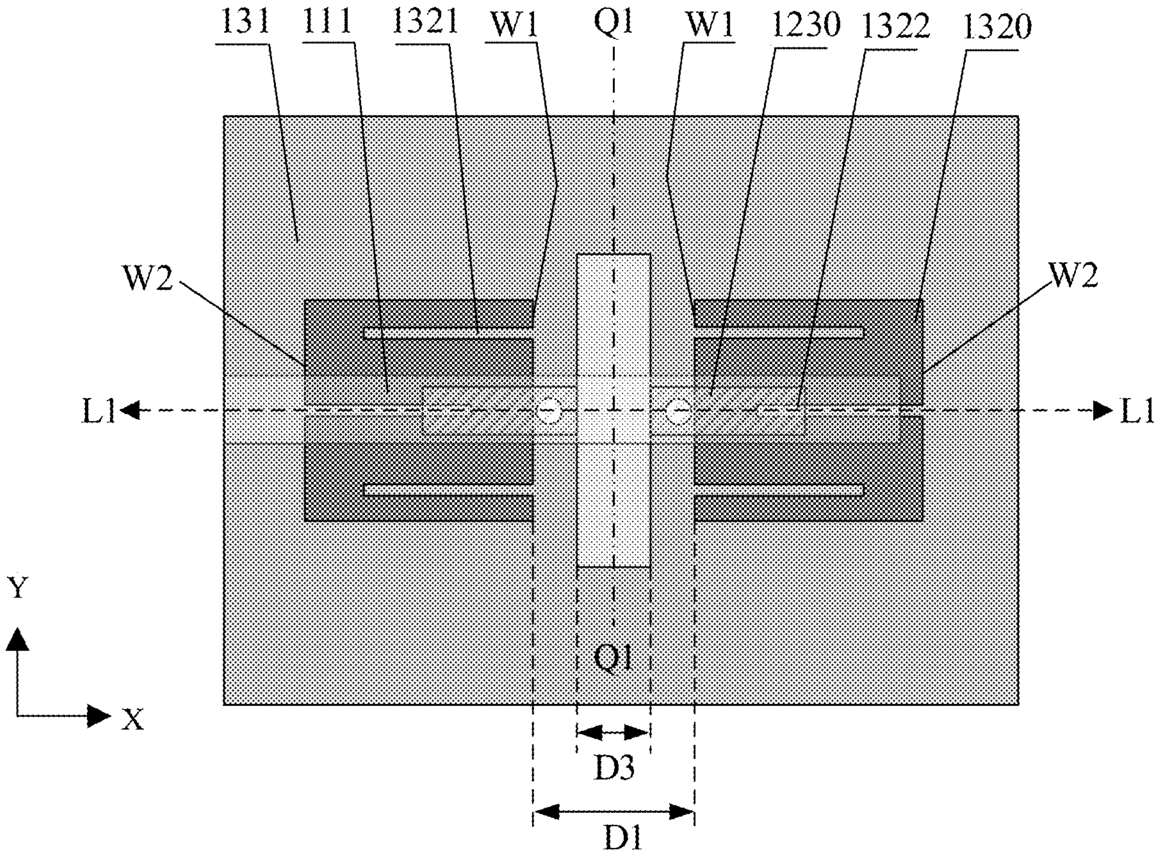
FIG. 1*a* is a schematic diagram of a planar structure of an antenna according to an embodiment of the present disclosure.
Figure 1B:
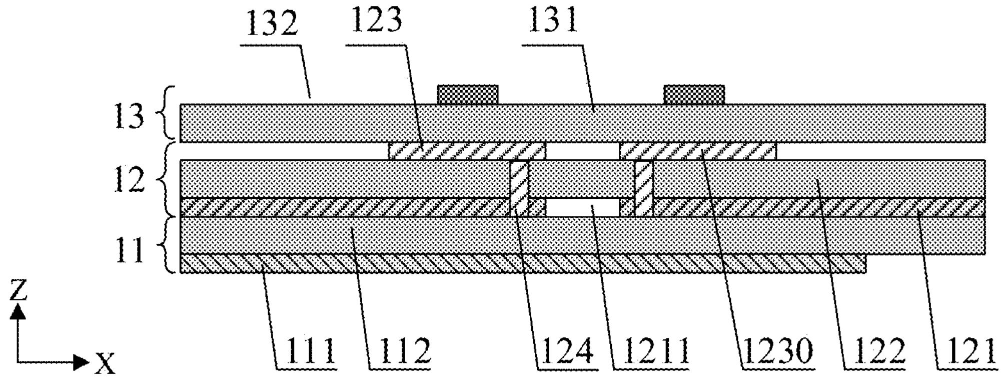
FIG. 1*b* is a schematic diagram of the cross-section structure of the L1-L1 position in FIG. 1*a*.

The embodiments of the present disclosure will be described in detail below with reference to the drawings. Implementation modes may be implemented in multiple different forms. Those of ordinary skills in the art may easily understand such a fact that implementation modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

Scales of the drawings in the present disclosure may be used as a reference in the actual process, but are not limited thereto. For example, a thickness and a pitch of each film layer, and a width and a pitch of each signal line may be adjusted according to an actual situation. The drawings described in the present disclosure are only schematic diagrams of structures, and a mode of the present disclosure is not limited to shapes or numerical values or the like shown in the drawings.

Ordinal numerals such as "first", "second", and "third" in the specification are set to avoid confusion of components, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between components with reference to the drawings, and are merely for facilitating the description of the specification and simplifying the description, rather than indicating or implying that a referred apparatus or element must have a particular orientation and be constructed and operated in the particular orientation. Therefore, they cannot be interpreted as limitations on the present disclosure. The positional relationships between the components may be changed as appropriate according to a direction which is used for describing each component. Therefore, appropriate replacements may be made according to situations without being limited to the wordings described in the specification.

In the specification, unless otherwise specified and defined explicitly, terms "mount", "mutually connect", and "connect" should be interpreted in a broad sense. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, "electrical connection" includes a case that components are connected together through an element with a certain electrical effect. The "element with the certain electrical effect" is not particularly limited as long as electrical signals may be sent and received between the connected components. Examples of the "element having some electrical effect" not only include an electrode and a wiring, but also a switch element such as a transistor, a resistor, an inductor, a capacitor, another element having one or more functions, and the like.

In the specification, "parallel" refers to a state in which an angle formed by two straight lines is −10° or more and 100 or less, and thus may include a state in which the angle is −5° or more and 5° or less. In addition, "perpendicular" refers to a state in which an angle formed by two straight lines is above 80 degrees and below 100 degrees, and thus may include a state in which the angle is above 85 degrees and below 95 degrees.

In the specification, a "film" and a "layer" are interchangeable. For example, a "conductive layer" may be replaced with a "conductive film" sometimes. Similarly, an "insulation film" may be replaced with an "insulation layer" sometimes.

Triangle, rectangle, trapezoid, pentagon and hexagon in this specification are not strictly defined, and they may be approximate triangle, rectangle, trapezoid, pentagon or hexagon, etc. There may be some small deformation caused by tolerance, and there may be chamfer, arc edge and deformation, etc.

In the present disclosure, "about" refers to that a boundary is defined not so strictly and numerical values within process and measurement error ranges are allowed.

In the present disclosure, a "thickness" is a size of a film layer in a direction perpendicular to a substrate.

The function of a filter is to filter clutter interference signal by frequency selection. It is an essential RF device in RF front-end. For a system supporting multi-frequency communication, it needs multiple links, and the filter is essential in each link. With the development of a communication system towards functional integration, if the filtering function and the antenna radiation function can be integrated into a single antenna, on the premise of not affecting the radiation performance of the antenna, the antenna has a filtering function at the same time, that is, the filter component and the antenna component are integrated designed. This kind of antenna is called filter antenna, which will further reduce the complexity of a wireless communication system with multi-frequency, multi-standard and multi-mode and bring great practical value. Therefore, the design of filter antenna has become a research hotspot.

Usually, in the RF front-end module, the output of the transceiver chip is a balanced signal including two signals with equal amplitudes and opposite directions, i.e., differential signals. Compared with a single-ended signal, differential signals can greatly reduce the interference of common mode signal and environmental noise. But the antenna is a single-port device, before the signal enters the antenna, it is necessary to connect a balun device for balanced-unbalanced signal conversion. The introduction of the balun device not only increases the insertion loss of the system, but also introduces unnecessary signals. Facing this situation, a usual solution is to connect a filter between an antenna and a balun device to filter clutter, which introduces additional insertion loss and increases the volume of the system.

Embodiments of the present disclosure provide an antenna. As shown in FIGS. 1*a*, 1*b*, 3-5, 7, 9, 13 and 16, the antenna may include a first feed layer 11, a second feed layer 12 and a radiation structure layer 13 which are stacked.

The first feed layer 11 may include a micro-strip line structure 111 and a first dielectric substrate 112 which are stacked, the micro-strip line structure 111 is disposed on a side of the first dielectric substrate 112 away from the second feed layer 12.

The second feed layer 12 includes a reference ground structure 121, a second dielectric substrate 122, and a first conductive structure 123 which are stacked. The reference ground structure 121 is disposed on a side of the second dielectric substrate 122 facing the first feed layer 11. The first conductive structure 123 is disposed on a side of the second dielectric substrate 122 away from the first feed layer 11. The first conductive structure 123 includes multiple first conductive patches 1230, the second dielectric substrate 122 is provided with multiple electrical connection structures 124, and the multiple first conductive patches 1230 are electrically connected with the reference ground structure 121 through multiple electrical connection structures 124 respectively. The reference ground structure 121 is provided with a first slot 1211, and in a plane where the feed layer 12 is located, the multiple first conductive patches 1230 are symmetrically arranged with respect to the first centerline Q1-Q1, wherein the first centerline Q1-Q1 is a centerline of the first slot 1211 extending along the second direction Y, and the first direction X intersect with the second direction Y.

The radiation structure layer 13 includes a third dielectric substrate 131 and a second conductive structure 132 which are stacked, the second conductive structure 132 is arranged on a side of the third dielectric substrate 131 away from the second feed layer 12, the second conductive structure 132 includes multiple second conductive patches 1320, in a plane where the antenna is located, the multiple second conductive patches 1320 are symmetrically arranged with respect to the first centerline Q1-Q1, any one of the second conductive patches 1320 is provided with at least one second slot 1321, and the second slots 1321 on the multiple second conductive patches 1320 are symmetrically arranged with respect to the first centerline Q1-Q1 in a first direction, and the second slot 1321 extends to an edge of a side of the second conductive patch 1320 close to the first centerline Q1-Q1.

The antenna provided according to the embodiments of the present disclosure includes a first feed layer, a second feed layer and a radiation structure layer, wherein the first feed layer includes a first dielectric substrate and a micro-strip line structure, and the micro-strip line structure is arranged on a side of the first dielectric substrate away from the second feed layer. The second feed layer includes a reference ground structure, a second dielectric substrate, and a first conductive structure which are stacked, the first conductive structure includes multiple first conductive patches, the first conductive patch is electrically connected with the reference ground structure through an electrical connection structure on the dielectric substrate, the reference ground structure is provided with a first slot, the two first conductive patches are symmetrically arranged with respect to the first centerline, the first centerline is a centerline of the first slot extending along a second direction, the radiation structure layer includes a third dielectric layer substrate and a second conductive structure which are stacked, the second conductive structure includes multiple second conductive patches, a second slot is provided on a second conductive patch, and the second slots on the multiple second conductive patches are symmetrically arranged with respect to the first centerline. The antenna provided according to the embodiments of the present disclosure can achieve good filtering characteristics without increasing antenna volume or introducing additional insertion loss.

The antenna provided according to the embodiments of the invention achieves good filtering characteristics without adding a balun device or a filter device, which saves antenna space and reduces antenna volume.

In an embodiment of the present disclosure, the reference ground structure 121 may be a metal conductive structure.

As shown in FIGS. 1*a*, 1*b*, 3-5, 7, 9, 13 and 16, the second conductive patch 1320 includes a first side W1 and a second side W2 which are disposed opposite to each other along the first direction, the first side W1 is located on a side of the second conductive patch 1320 close to the first centerline Q1-Q1, and the second side W2 is located on a side of the second conductive patch 1320 away from the first centerline Q1-Q1. Wherein, the second slot 1321 extends to the first side W1 close to the first centerline Q1-Q1.

In an exemplary embodiment, as shown in FIGS. 1, 3-5, 7, 9, 13 and 16, the number of first conductive patches 1230 in the first conductive structure 123 is two, and the two first conductive patches 1230 are arranged along the first direction X.

The number of second conductive patches 1320 in the second conductive structure 132 is two, and the two second conductive patches 1320 are arranged in the first direction X.

In an exemplary embodiment, as shown in FIG. 1*a*, in the plane where the radiation structure layer 13 is located, two second conductive patches 1320 are both symmetrically arranged with respect to the second centerline Q2-Q2, the second centerline Q2-Q2 is the centerline of the first antenna extending along the first direction X; the second slots 1321 on the same second conductive patch 1320 are disposed symmetrically in the second direction Y with respect to the second centerline Q2-Q2. The open end of the second slot 1321 is on the first side W1 of the second conductive patch.

In an embodiment of the present disclosure, in the plane where the radiation structure layer 13 is located, the second slots 1321 on the two second conductive patches 1320 are symmetrically arranged in the first direction X with respect to the first centerline Q1-Q1, and the second slot 1321 on any one of the second conductive patches 1320 is symmetrically arranged in the second direction Y with respect to the second centerline Q2-Q2.

In an exemplary embodiment, the number of second slots 1321 on the same second conductive patch 1320 may be one to three.

In an exemplary embodiment, as shown in FIG. 1*a*, any one of the second conductive patches 1320 is further provided with a third slot 1322, in the plane where the radiation structure layer 13 is located, the third slot 1322 is symmetrically arranged with respect to the second centerline Q1-Q1 along the second direction Y, and the third slots 1322 on the two second conductive patches 1320 are symmetrically arranged with respect to the first centerline Q2-Q2 along the first direction X; the third slot 1322 extends to an edge of a side of the second conductive patch 1320 away from the first centerline Q1-Q1, i.e. the third slot 1322 extends to the second side W2 of the second conductive patch 1320. In an embodiment of the present disclosure, the open end of the third slot 1322 is on the second side W2 of the second conductive patch 1320.

Figure 2:
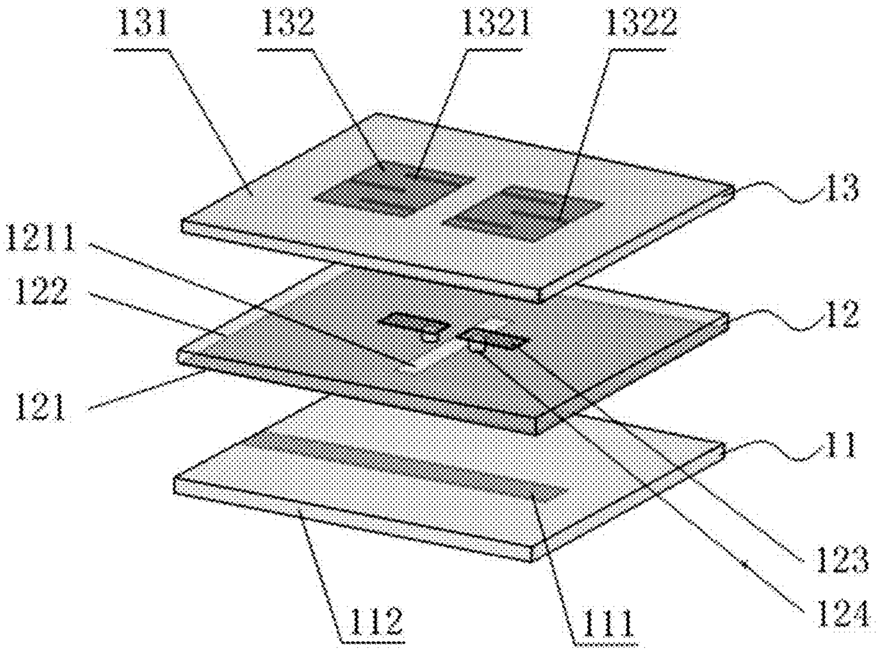
FIG. 2 is a schematic diagram of a breakdown structure of the antenna shown in FIG. 1.

In an exemplary embodiment, in the structure shown in FIGS. 1 and 2, in the plane where the radiation structure layer 13 is located, the second slot 1321 and the third slot 1322 each has a size of 1 mm to 2 mm in the first direction X and the second slot 1321 and the third slot 1322 each has a size of 0.1 mm to 0.2 mm in the second direction Y. For example, in the plane where the radiation structure layer 13 is located, the sizes of the second slot 1321 and the third slot 1322 in the first direction X are both 1.58 mm, and the sizes of the second slot 1321 and the third slot 1322 in the second direction Y are both 0.15 mm.

In an exemplary embodiment, as shown in FIG. 1*a*, on the same second conductive patch 1320, the number of second slots 1321 may be two, the number of third slots 1322 may be one, and the two second slots 1321 are disposed symmetrically in the second direction Y with respect to the third slots 1322. As shown in FIG. 2, it is a schematic diagram of the breakdown structure of the structure shown in FIG. 1.

Figure 3:
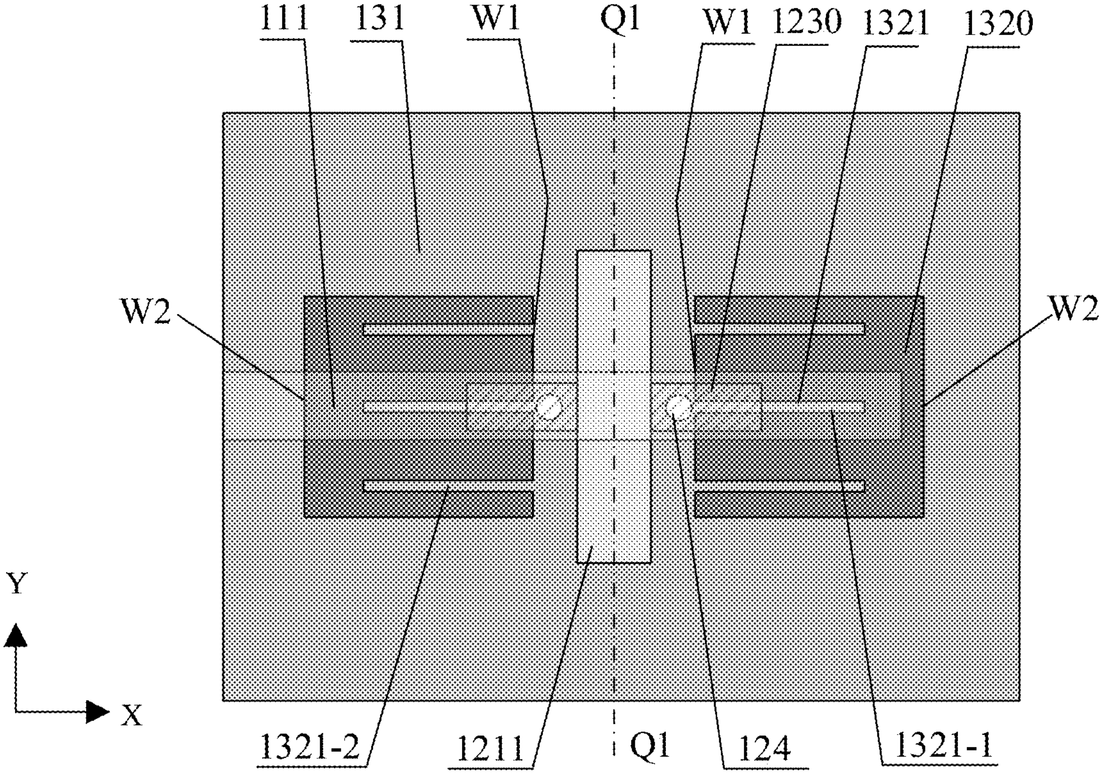
FIG. 3 is a schematic diagram of a planar structure of an antenna according to an exemplary embodiment of the present disclosure.
Figure 4:
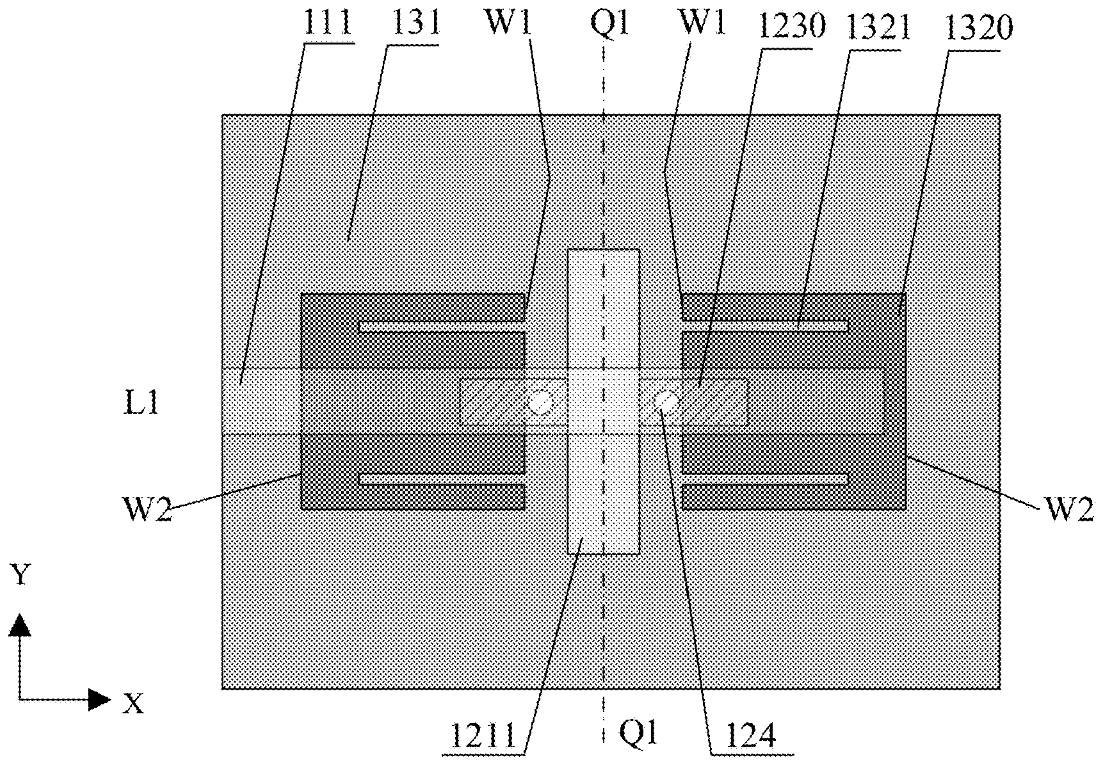
FIG. 4 is a schematic diagram of a planar structure of an antenna according to an exemplary embodiment of the present disclosure.
Figure 5:
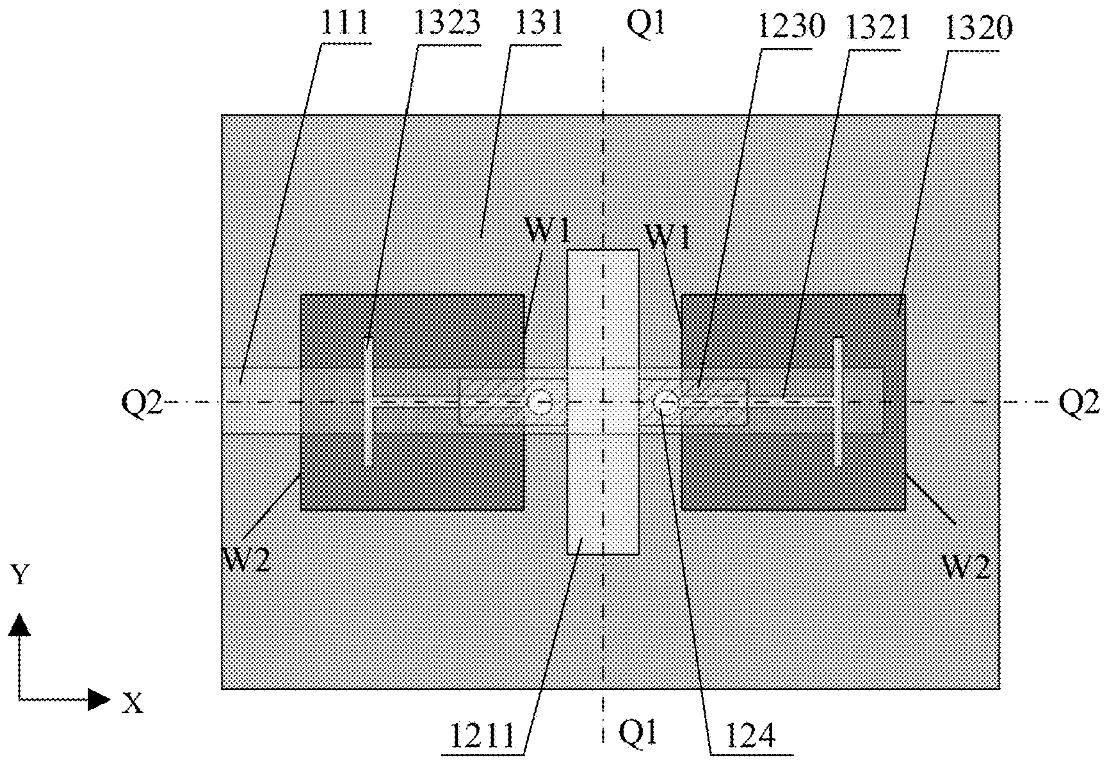
FIG. 5 is a schematic diagram of a planar structure of an antenna according to an exemplary embodiment of the present disclosure.
Figure 7:
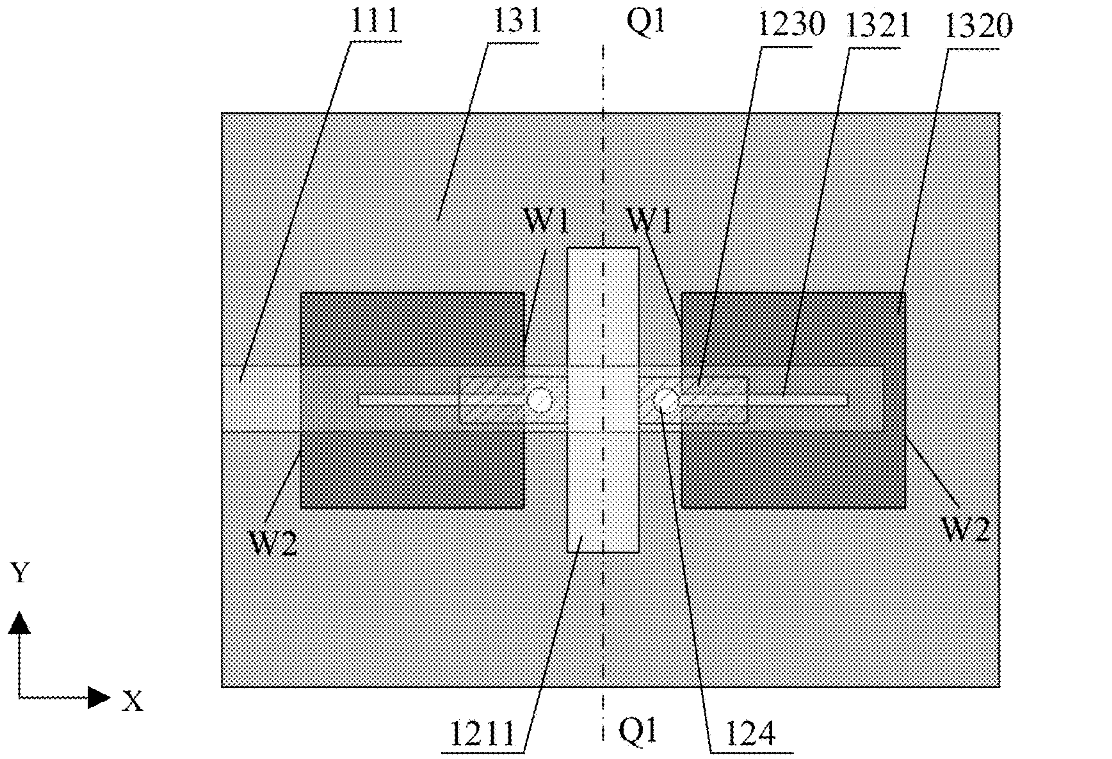
FIG. 7 is a schematic diagram of a planar structure of an antenna according to an exemplary embodiment of the present disclosure.
Figure 8:
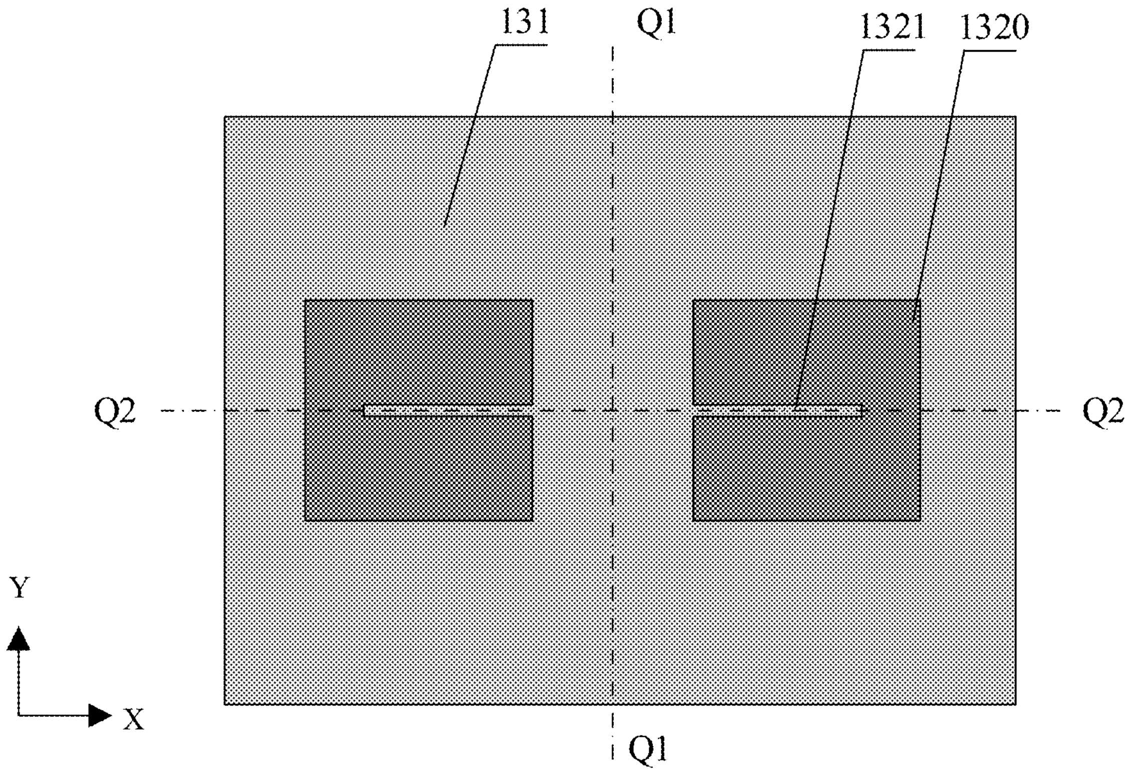
FIG. 8 is a schematic diagram of a planar structure of a radiation structure layer in the antenna shown in FIG. 7.

In an exemplary embodiment, as shown in FIG. 3, the number of second slots 1321 on the same second conductive patch 1320 may be three; or, as shown in FIGS. 1*a* and 4, the number of second slots 1321 on the same second conductive patch 1320 is two; or as shown in FIGS. 5 and 7, the number of second slots 1321 on the same second conductive patch 1320 is one.

In the structure shown in FIG. 3, in any one of the second conductive patches 1320, the second slots 1321 may include one second slot 1321-1 located in the middle and two second slots 1321-2 located at two ends, wherein the second slot 1321-1 located in the middle is disposed symmetrically with respect to the second centerline Q2-Q2, the two second slots 1321-2 located at two ends are arranged in the second direction and the two second slots 1321-2 are disposed symmetrically with respect to the second centerline Q2-Q2.

Figure 6:
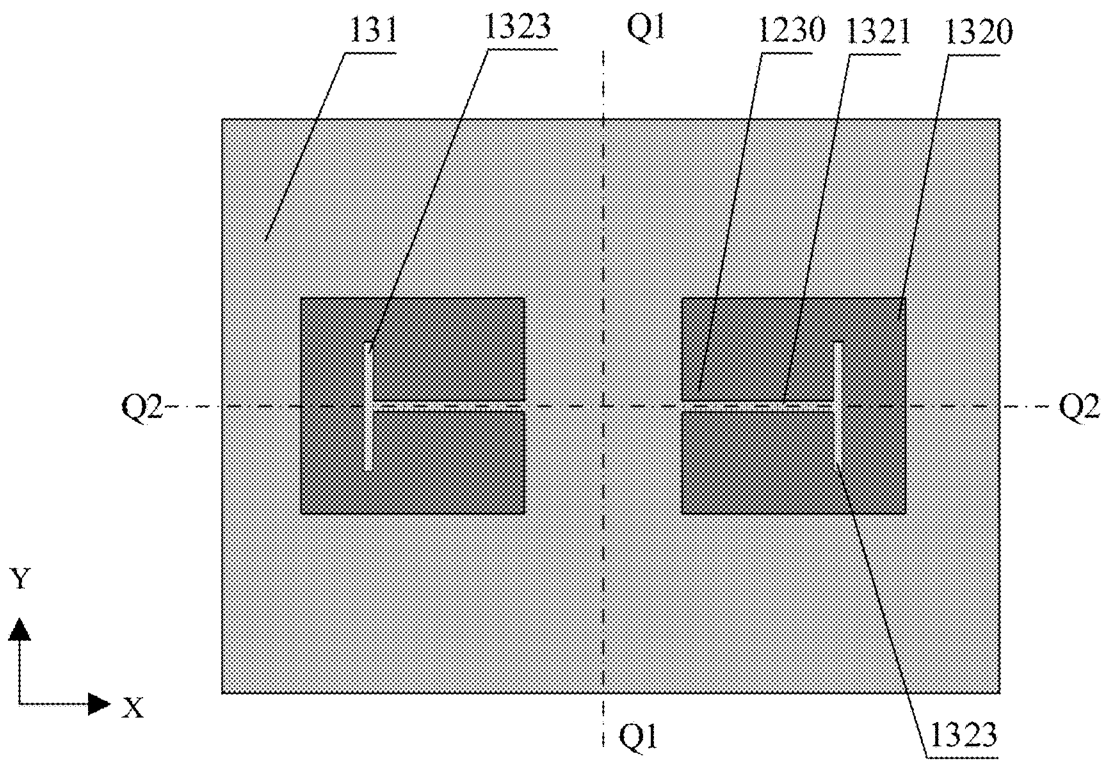
FIG. 6 is a schematic diagram of a planar structure of a radiation structure layer in the antenna shown in FIG. 5.

In an exemplary embodiment, as shown in FIGS. 5 and 6, FIG. 5 is a schematic diagram of a planar structure of an antenna, and FIG. 6 is a schematic diagram of a planar structure of a radiation structure layer 13. Any one of the second conductive patches 1320 is further provided with a fourth slot 1323, and the number of the second slots 1321 is one. One end of the second slot 1321 away from the first centerline Q1-Q1 is connected with the fourth slot 1323. Both the second slot 1321 and the fourth slot 1323 are symmetrically arranged with respect to the second centerline Q2-Q2, and the second centerline Q2-Q2 is the centerline of the antenna extending along the first direction X.

In an embodiment of the present disclosure, in the structure shown in FIG. 5, the second slot 1321 and the fourth slot 1323 form a T-shaped gap.

In an exemplary embodiment, as shown in FIGS. 5 and 6, in a plane in which the radiation structure layer 13 is located, the second slot 1321 has a size of 0.9 mm to 1.8 mm in the first direction X and a size of 0.1 mm to 0.2 mm in the second direction Y; the fourth slot 1323 has a size of 0.1 mm to 0.2 mm in the first direction and a size of 1 mm to 2.1 mm in the second direction Y. For example, in the plane where the radiation structure layer 13 is located, the second slot 1321 has a size of 1.43 mm in the first direction X and a size of 0.15 mm in the second direction Y; the fourth slot 1323 has a size of 0.15 mm in the first direction X and a size of 1.58 mm in the second direction Y.

Figure 9:
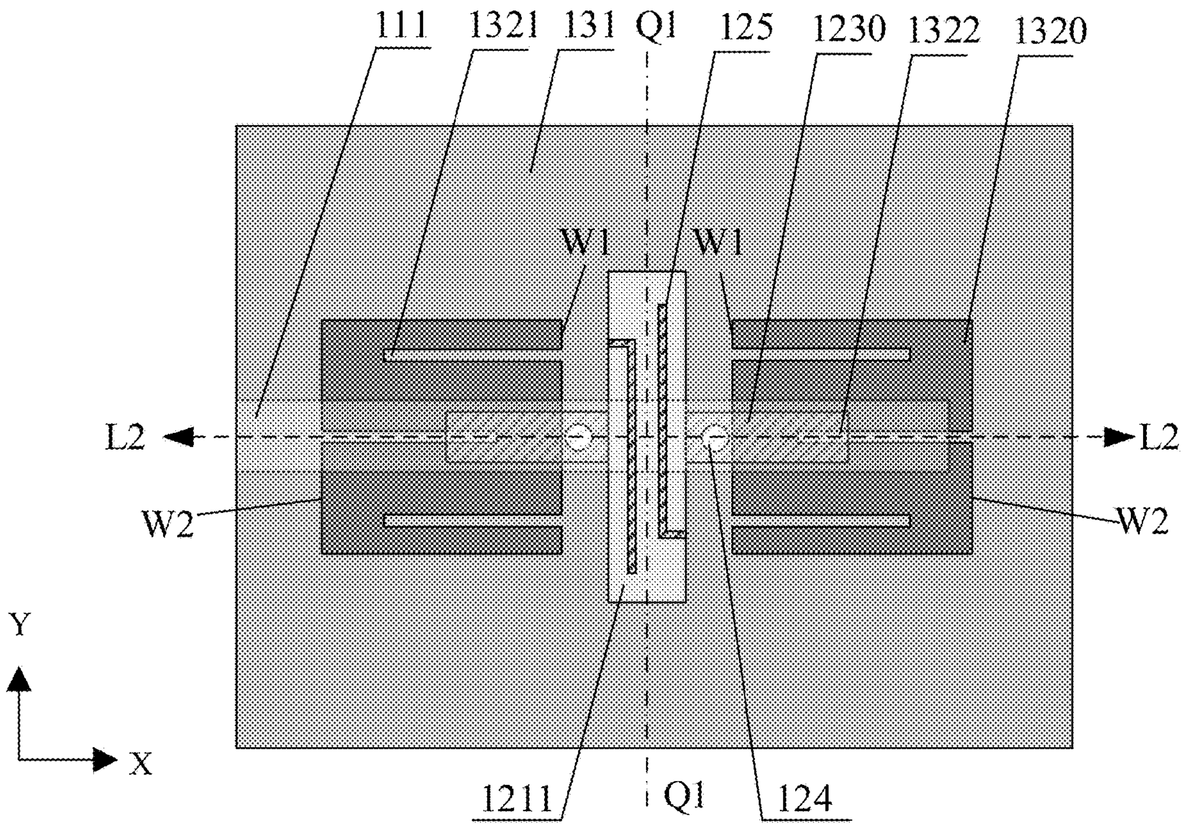
FIG. 9 is a schematic diagram of a planar structure of an antenna according to an exemplary embodiment of the present disclosure.
Figure 10:
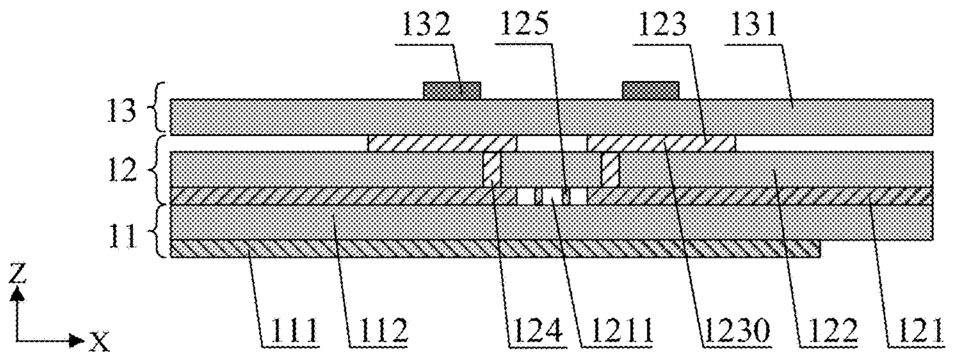
FIG. 10 is a schematic diagram of a cross-section structure of the L2-L2 position in FIG. 9.
Figure 11:
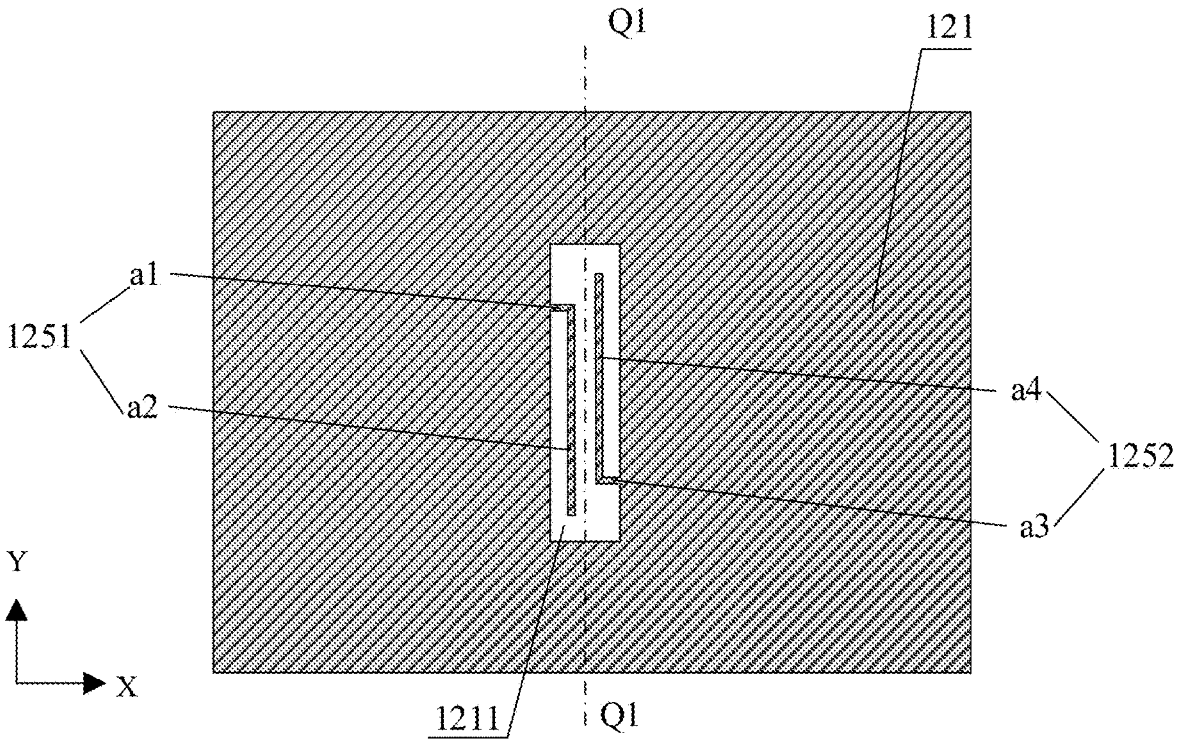
FIG. 11 is a schematic diagram of a planar structure of a reference ground structure in the antenna shown in FIG. 9.
Figure 12:
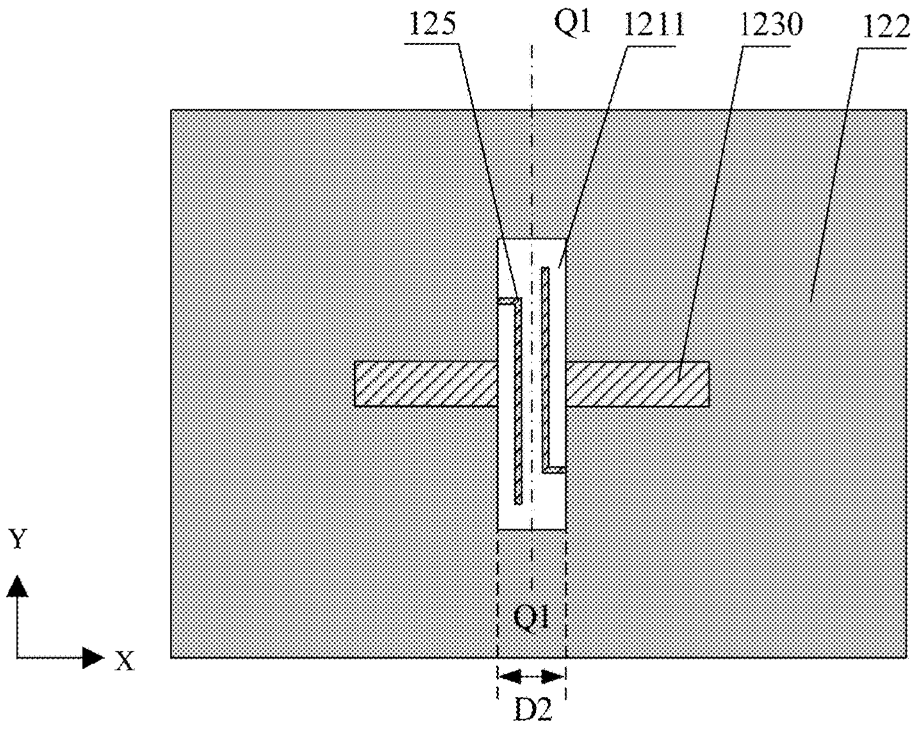
FIG. 12 is a schematic diagram of a planar structure of a second feed layer of the antenna shown in FIG. 9 located on a side of a first conductive structure.

In an exemplary embodiment, as shown in FIGS. 9 to 12, FIG. 9 is a schematic diagram of the planar structure of the antenna, FIG. 10 shows a cross-section structure diagram of the L2-L2 position in FIG. 9, FIG. 11 shows a planar structure diagram of the reference ground structure 121 in the second feed layer, and FIG. 12 shows a planar structure diagram of the second feed layer 12 located on a side of the first conductive structure 123, and a branch structure 125 connected with the reference ground structure 121 is also provided in the first slot 1211. In an exemplary embodiment, the branch structure 125 may be a bent branch structure.

In an exemplary embodiment, as shown in FIG. 11, the branch structures 125 may include a first branch structure 1251 and a second branch structure 1252; the first branch structure 1251 and the second branch structure 1252 are arranged along the first direction X and distributed on two sides of the first centerline Q1-Q1; in an embodiment of the present disclosure, both the first branch structure 1251 and the second branch structure 1252 are end-open structures.

The first branch structure 1251 includes a first connection line a1 and a second connection line a2, the first connection line a1 extends in a first direction X, an end of the first connection line a1 away from the first centerline Q1-Q1 is connected to the reference ground structure 121 and an end of the first connection line a1 close to the first centerline Q1-Q1 is connected to the second connection line a2; a first end of the second connection line a2 is connected to the first connection line a1 and a second end of the second connection line a2 extends in the opposite direction of the second direction Y and is not out of the range of the first slot 1211.

The second branch structure 1252 includes a third connection line a3 and a fourth connection line a4, the third connection line a3 extends in a first direction X, an end of the third connection line a3 away from the first centerline Q1-Q1 is connected to the reference ground structure 121 and an end of the third connection line a3 close to the first centerline Q1-Q1 is connected to the fourth connection line a4; a first end of the fourth connection line a4 is connected to the third connection line a3 and a second end of the fourth connection line a4 extends in the second direction Y and is not out of the range of the first slot 1211.

Figure 13:
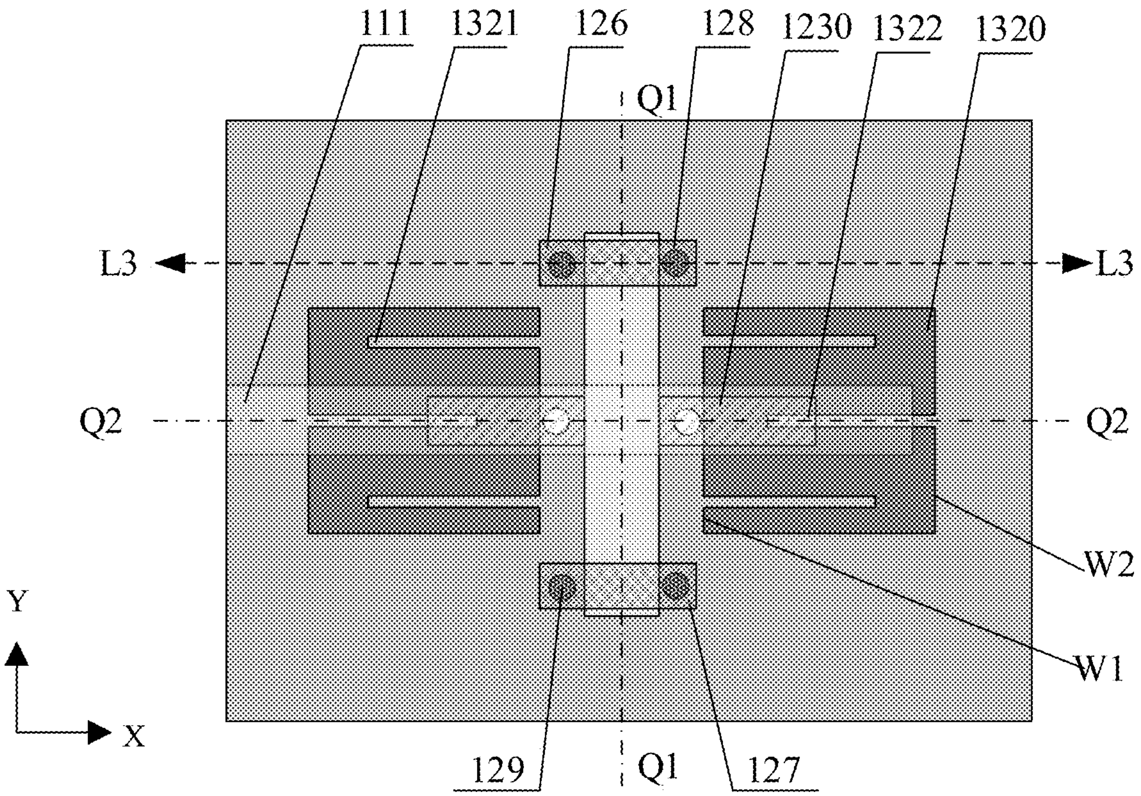
FIG. 13 is a schematic diagram of a planar structure of an antenna according to an exemplary embodiment of the present disclosure.
Figure 14:
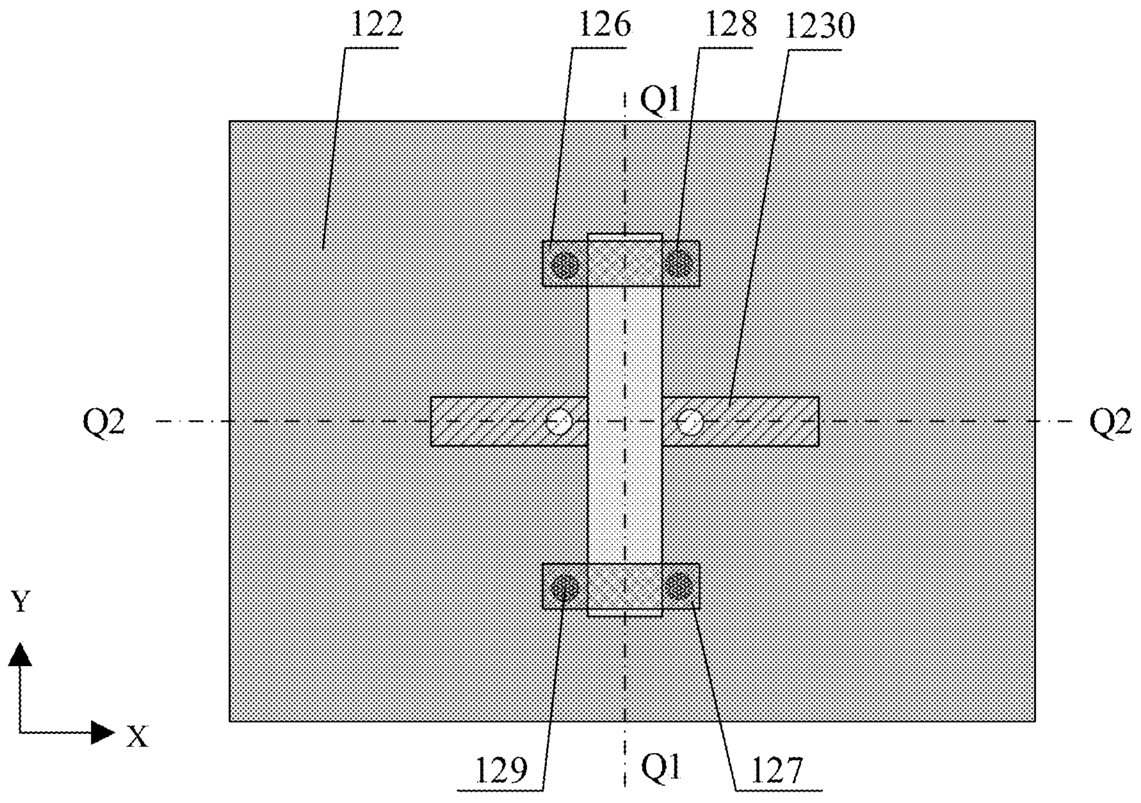
FIG. 14 is a schematic diagram of a planar structure of a second feed layer in the antenna shown in FIG. 13.
Figure 15:
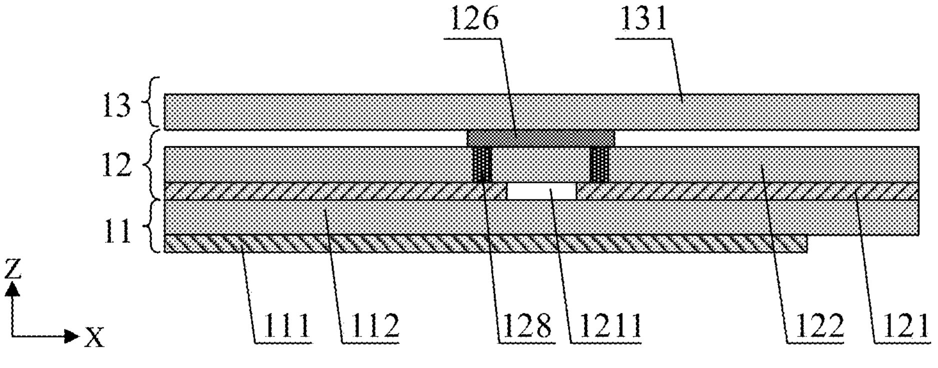
FIG. 15 is a schematic diagram of a cross-section structure of the L3-L3 position in FIG. 13.

In an exemplary embodiment, as shown in FIGS. 13 to 15, FIG. 13 is a schematic diagram of a planar structure of an antenna, FIG. 14 is a schematic diagram of the planar structure of the second feed layer 12, and FIG. 15 is a schematic diagram of a cross-section structure of the L3-L3 position in FIG. 13. The second feed layer 12 further includes a first short-circuit connection structure 126 and a second short-circuit connection structure 127 arranged in the same layer as the first conductive structure 123, and the second dielectric substrate 122 is further provided with two first short-circuit connection posts 128 and two second short-circuit connection posts 129.

The first short-circuit connection structure 126 achieves a short-circuit connection with the reference ground structure 121 through the two first short-circuit connection posts 128, and the second short-circuit connection structure 127 achieves a short-circuit connection with the reference ground structure 121 through the two second short-circuit connection posts 129.

In an exemplary embodiment, as shown in FIGS. 13 and 14, the first short-circuit connection structure 126 and the second short-circuit connection structure 127 are symmetrically arranged with respect to the first centerline Q1-Q1, and the first conductive connection structure 126 and the second conductive connection structure 127 are located on two sides of the first conductive structure 123 along the second direction Y and are symmetrically arranged with respect to a second centerline Q2-Q2, wherein the second centerline Q2-Q2 is a centerline of the antenna extending along the first direction X.

In the plane where the antenna is located, the two first short-circuit connection posts 128 are distributed on two sides of the first slot 1211 and are symmetrically arranged with respect to the first centerline Q1-Q1, and the two second short-circuit connection posts 129 are distributed on two sides of the first slot 1211 and symmetrically arranged with respect to the first centerline Q1-Q1.

The orthographic projections of the first short-circuit connection post 128 and the second short-circuit connection post 129 on the first dielectric substrate 112 are not overlapped with the orthographic projections of the first slot 1211 and the first conductive structure 123 on the first dielectric substrate; the orthographic projections of the first short-circuit connection structure 126 and the second short-circuit connection structure 127 on the first dielectric substrate 112 are at least partially overlapped with the orthographic projection of the first slot 121 on the first dielectric substrate 112.

In an exemplary embodiment, there is no overlapped region between the orthographic projections of the first short-circuit connection structure 126 and the second short-circuit connection structure 127 on the first dielectric substrate 112 and the orthographic projection of the first conductive structure 123 on the first dielectric substrate 112.

In this embodiment of the disclosure, there is no overlapped region between the orthographic projections of the first short-circuit connection structure 126 and the second short-circuit connection structure 127 on the first dielectric substrate 112 and the orthographic projections of the first conductive structure 123 and the second conductive structure 132 on the first dielectric substrate 112.

Figure 16:
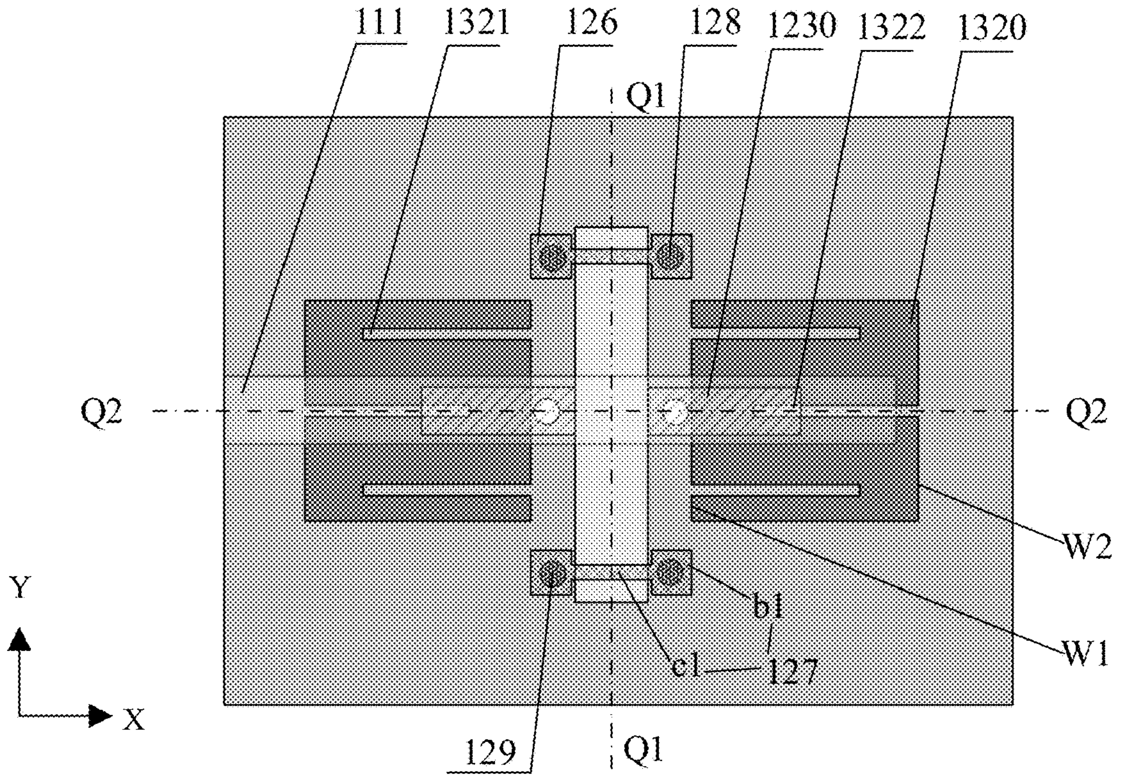
FIG. 16 is a schematic diagram of a planar structure of an antenna according to an exemplary embodiment of the present disclosure.

In an exemplary embodiment as shown in FIGS. 13 and 14, the shapes of the first short-circuit connection structure 126 and the second short-circuit connection structure 127 include rectangles; or, as shown in FIG. 16, the shapes of the first short-circuit connection structure 126 and the second short-circuit connection structure 127 include an I-shaped structure rotated by 90 degrees.

In an exemplary embodiment, in the plane where the second feed layer 12 is located, the rectangular first short-circuit connection structure 126 and the rectangular second short-circuit connection structure 127 have sizes from 1.5 mm to 2.1 mm in the first direction X and from 0.3 mm to 0.7 mm in the second direction Y. For example, in the plane where the second feed layer 12 is located, the rectangular first short-circuit connection structure 126 and the rectangular second short-circuit connection structure 127 have a size of 1.8 mm in the first direction X and of 0.5 mm in the second direction Y.

In an exemplary embodiment, the first short-circuit connection structure 126 of the I-shaped structure and the rectangular second short-circuit connection structure 127 have sizes from 1.5 mm to 2.1 mm in the first direction, the I-shaped structure includes two end parts b1 and an intermediate connection cl connecting the two end parts, and the two end parts b1 of the I-shaped structure have sizes from 0.3 mm to 0.7 mm in the second direction Y; the intermediate connection part cl of the I-shaped structure has a size of 0.1 mm to 0.3 mm in the second direction Y and a size of 0.6 mm to 1 mm in the first direction X. For example, the sizes of the first short-circuit connection structure 126 of the I-shaped structure and the rectangular second short-circuit connection structure 127 in the first direction are 1.8 mm, and the sizes of the two end parts b1 of the I-shaped structure in the second direction Y are 0.5 mm; the size of the intermediate connection cl in the second direction Y is 0.2 mm, and the size of the intermediate connection cl in the first direction X is 0.8 mm.

In an exemplary embodiment, as shown in FIGS. 1-5, 7, 9, 13, and 16, an orthographic projection of the micro-strip line structure on the plane where the first dielectric substrate 112 is located is at least partially overlapped with orthographic projections of multiple first conductive patches 123, multiple second conductive patches 132, and the first slot 1211 on the first dielectric substrate 112.

Figure 17:
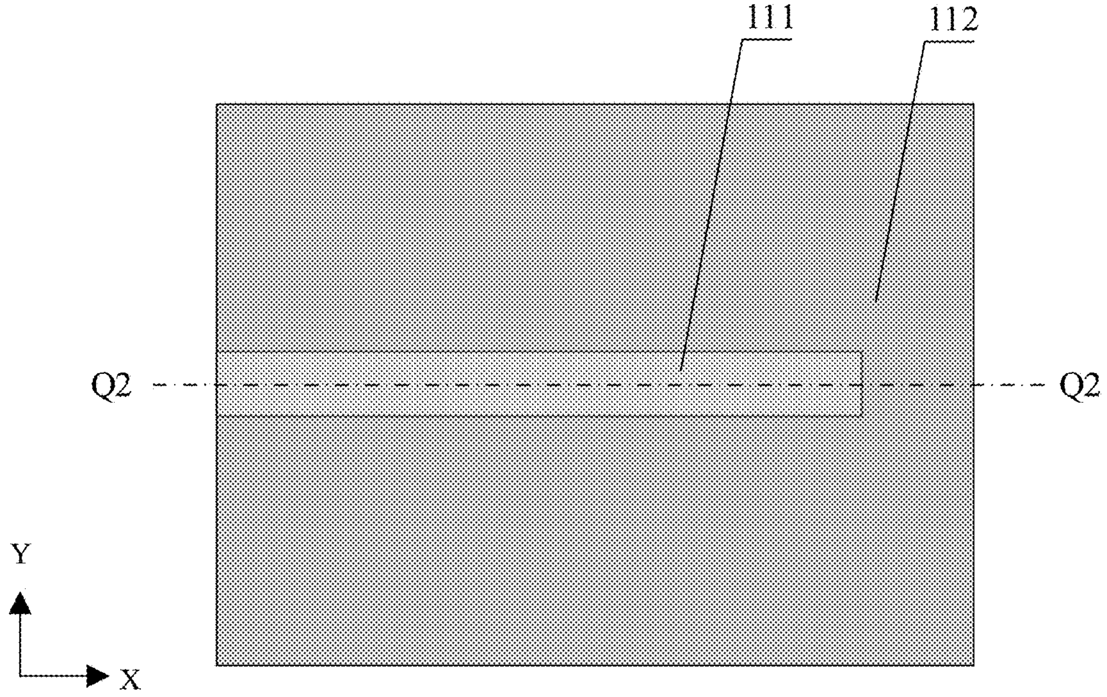
FIG. 17 is a schematic diagram of a planar structure of a first feed layer according to an exemplary embodiment of the present disclosure.

In an exemplary embodiment, as shown in FIG. 17, which is a planar structure diagram of the first feed layer 11, in the plane where the first feed layer 11 is located, the micro-strip line structure 111 is symmetrically arranged in the second direction Y with respect to the second centerline Q2-Q2, which is the centerline of the antenna extending in the first direction X.

In an exemplary embodiment, in the plane where the first feed layer 11 is located, the first micro-strip line structure 111 has a size of 6 mm to 10 mm in the first direction X, and the first micro-strip line structure 111 has a size of 0.8 mm to 1.4 mm in the second direction Y. For example, in the plane where the first feed layer 11 is located, the size of the first micro-strip line structure 111 in the first direction X is 8 mm, and the size of the first micro-strip line structure 111 in the second direction Y is 1.15 mm.

In an exemplary embodiment, as shown in FIGS. 1*a* and 2, the electric connection structure 124 and the corresponding first conductive patch 1230 form an L-shaped probe, in the plane where the second feed layer 12 is located, the two L-shaped probes are symmetrically arranged with respect to the first centerline Q1-Q1 along the first direction X, the two L-shaped probes are symmetrically arranged with respect to the second centerline Q2-Q2, and the second centerline Q2-Q2 is the centerline of the antenna extending along the first direction X.

In an exemplary embodiment, the low frequency cut-off frequency of the antenna is calculated by the following formula:

$$f_{cutoff,lower} \approx \frac{c}{4.5(ll+h)\sqrt{\varepsilon_r}}$$

among them, $f_{cutoff,lower}$ is the low frequency cut-off frequency of the antenna, c is the speed of light, ll is the size of the first conductive patch 1320 along the first direction X, $\varepsilon_r$ is the dielectric constant of the second dielectric substrate 122, and h is the thickness of the second dielectric substrate 122.

In an embodiment of the present disclosure, when the dielectric constant of the second dielectric substrate 122 is determined, the low frequency cut-off frequency $f_{cutoff,lower}$ may be determined according to the size of the first conductive patch 1320 ll in the first direction X.

In an exemplary embodiment, the high frequency cut-off frequency of the antenna is calculated by the following formula:

$$f_{cutoff,upper} \approx \frac{c}{1.25l_{s2}\sqrt{\varepsilon_r}}$$

among them, $f_{cutoff,upper}$ is the high frequency cut-off frequency of the antenna, c is the speed of light, $\varepsilon_r$ is the dielectric constant of the second dielectric substrate 122, and $l_{s2}$ is the size of the first slot 1211 along the second direction Y.

In an embodiment of the present disclosure, when the dielectric constant of the second dielectric substrate 122 is determined, the high frequency cut-off frequency $f_{cutoff,upper}$ may be determined according to the size of the first slot 1211 $l_{s2}$ in the second direction Y.

In an exemplary embodiment, in the plane where the antenna is located, the size of the first slot 1211 in the second direction Y is larger than the size of the second conductive structure 132 in the second direction Y, the size of the second conductive structure 132 in the second direction Y is larger than the size of the first conductive structure 123 in the second direction Y, and the size of the second conductive structure 132 in the first direction X is larger than the size of the first conductive structure 123 in the first direction X.

The orthographic projections of the first conductive structure 123 and the second conductive structure 132 on the first dielectric substrate 112 are not overlapped with the orthographic projection of the first slot 1211 on the first dielectric substrate 112.

In the plane in which the antenna is located, in the first direction X as shown in FIGS. 1 and 12, the spacing D1 between the two second conductive patches 1320 is greater than the spacing D2 between the two first conductive patches 1230, and the spacing D2 between the two first conductive patches 1230 is greater than or equal to the size D3 of the first slot 1211 along the first direction X.

In an exemplary embodiment, in the plane where the second feed layer 12 is located, the first slot 1211 has a size of 0.4 mm to 0.8 mm in the first direction X and a size of 4.5 mm to 6.5 mm in the second direction Y; the first conductive patch 1230 has a size of 1 mm to 2 mm in the first direction X and a size of 0.7 mm to 1.1 mm in the second direction Y; the spacing between the two first conductive patches 1230 in the first direction X is 0.4 mm to 0.8 mm. For example, in the plane where the second feed layer 12 is located, the first slot 1211 has a size of 0.6 mm in the first direction X and a size of 5.05 mm in the second direction Y; the first conductive patch 1230 has a size of 1.58 mm in the first direction X and a size of 0.9 mm in the second direction Y; the spacing between the two first conductive patches 1230 in the first direction X is 0.46 mm.

In an exemplary embodiment, in the plane where the radiation structure layer 13 is located, the second conductive structure 132 has a size of 2 mm to 3.1 mm in the first direction X, a size of 3.1 mm to 4 mm in the second direction Y, and a spacing between the two second conductive patches 1320 in the first direction X is 0.8 mm to 1.2 mm. For example, in the plane where the radiation structure layer 13 is located, the second conductive structure 132 has a size of 2.6 mm in the first direction X, a size of 3.65 mm in the second direction Y, and a spacing between the two second conductive patches 1320 in the first direction X is 1 mm.

In an exemplary embodiment, the thicknesses of the first dielectric substrate 112, the second dielectric substrate 122 and the third dielectric substrate 131 are all 0.2 mm to 0.5 mm, and the thicknesses of the reference ground structure 121, the first conductive structure 123 and the second conductive structure 132 are all 0.01 mm to 0.03 mm. For example, the thicknesses of the first dielectric substrate 112, the second dielectric substrate 122, and the third dielectric substrate 131 are all 0.381 mm, and the thicknesses of the reference ground structure 121, the first conductive structure 123, and the second conductive structure 132 are all 0.018 mm.

In embodiments of the present disclosure, the thickness can be understood as a size in the third direction Z as in FIG. 10.

In an exemplary embodiment, the micro-strip line structure 111, the reference ground structure 121, the first conductive structure 123, and the second conductive structure 132 may employ a metal having good electrical conductivity, such as a reference ground structure made of copper, gold, silver, etc.

In an embodiment of the present disclosure, the first dielectric substrate 112, the second dielectric substrate 122, and the third dielectric substrate 131 may employ a lossy dielectric substrate, and the dielectric constant of the first dielectric substrate 112, the second dielectric substrate 122, and the third dielectric substrate 131 may take a value of 2-2.4, for example, the dielectric constant may take a value of 2.2; the dielectric loss may be 0.0007-0.0011, for example, the dielectric loss can be 0.0009.

The antenna structure provided according to the embodiments of the present disclosure neither introduces an additional filter circuit nor loads a parasitic structure on the antenna structure. The antenna can achieve good filter response, good sideband selectivity and out-of-band rejection characteristics, high antenna gain, low cross polarization level, good gain flatness of antenna in passband, wide impedance bandwidth, easy integration with other modules, simple antenna structure, easy machining, and small antenna size.

With the antenna provided according to an embodiment of the present disclosure, energy is fed from the micro-strip line structure 111 of the first feed layer 11, upward coupled through a gap (i.e. first slot 1211) of the metallic GND layer (i.e. reference ground structure 121) of the second feed layer, and then coupled to the radiation structure layer 13 by an L-shaped probe layer (formed by the first conductive structure 123 and the electrical connection structure 124).

The feed of energy from the micro-strip structure 111 is a single-port feed, which is an unbalanced process. The upward coupled energy passes through a differential structure of a pair of L-shaped probes, and the energy is balanced coupled to a pair of radiation patches (i.e., the second conductive patches 1320), so there is no need to introduce additional balun devices for an unbalanced-balanced conversion of signals In addition, the symmetrical slotting design on each second conductive patch 1320 significantly improves the filtering characteristics of the antenna, thereby improving the out-of-band rejection level of the antenna.

With the antenna provided according to the embodiments of the present disclosure, there is a radiation zero on two sides of the passband respectively, which greatly enhances the out-of-band rejection level. Moreover, due to the low cross polarization level of the differential coupling excitation antenna, and because no additional filter circuit is introduced at the same time, no insertion loss is introduced, the radiation efficiency of the antenna is high, and the gain flatness of the antenna in the passband is high. The results of the antenna simulation of the above embodiments are described in detail below.

Embodiments of the present disclosure use electromagnetic simulation software (such as HFSS software) to simulate an antenna, the dielectric constant of the first dielectric substrate 112, the second dielectric substrate 122 and the third dielectric substrate 131 is 2.2 and the dielectric loss is 0.0009. The micro-strip line structure 111, the reference ground structure 121, the first conductive structure 123 and the second conductive structure 132 are all made of copper with a thickness of 0.018 mm. The center frequency point f0 for antenna simulation is 28 GHz, and the sweep-frequency range is 20 GHz to 36 GHz.

Figure 18:
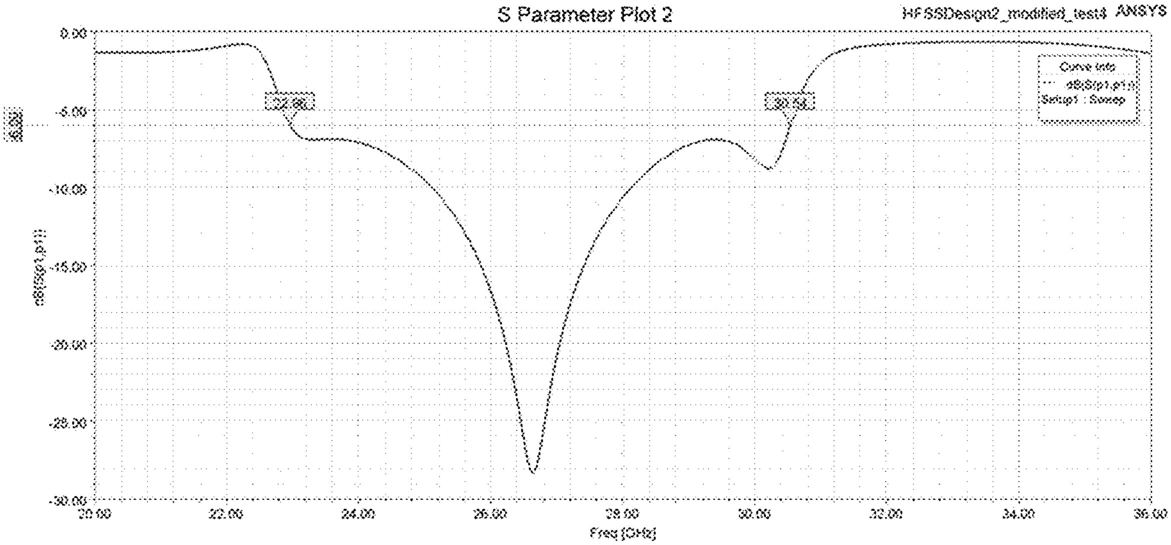
FIG. 18 shows a reflection coefficient S11 plot obtained by simulating the antenna shown in FIG. 1.
Figure 19:
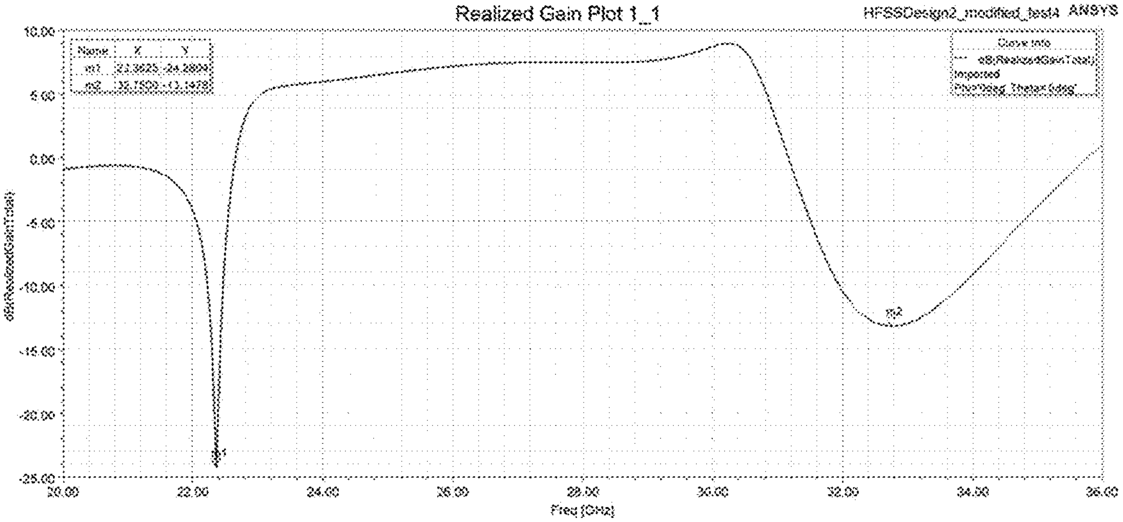
FIG. 19 shows a gain plot obtained by simulating the antenna shown in FIG. 1.
Figure 20:
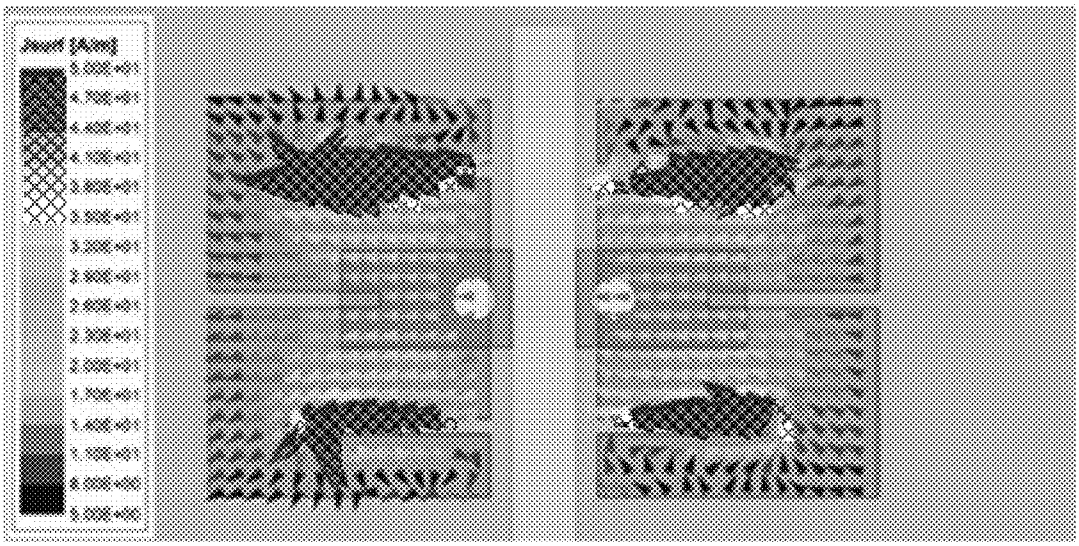
FIG. 20 is a schematic diagram of current vector distribution obtained by simulating the antenna shown in FIG. 1 at an operating frequency.
Figure 21:
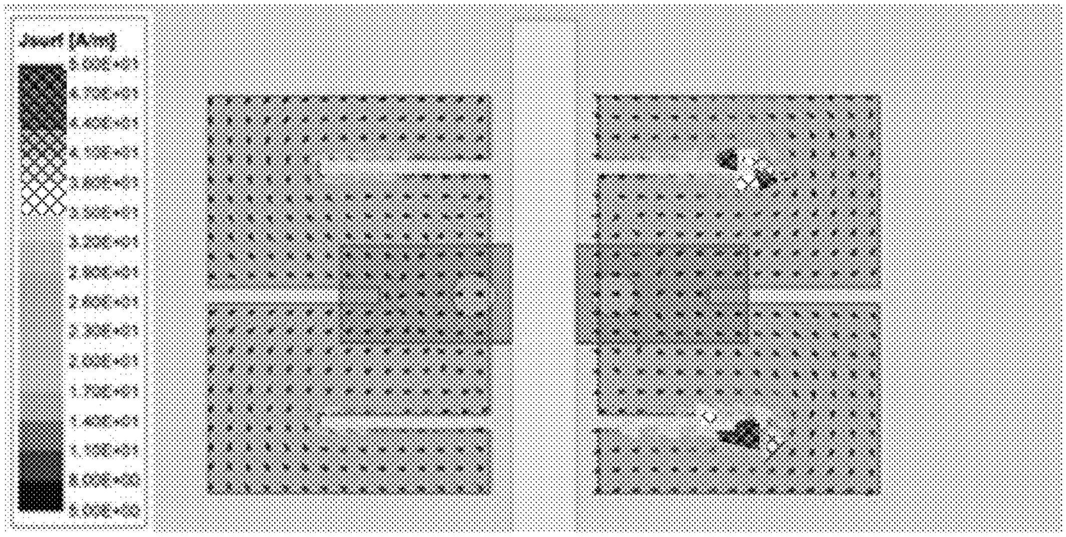
FIG. 21 is a schematic diagram of current vector distribution obtained by simulating the antenna shown in FIG. 1 at a frequency in stopband.

The simulation results of the antenna structure shown in FIG. 1 are as shown in FIG. 18 to FIG. 21. The reflection coefficient S11 plot of the antenna is shown in FIG. 18. The impedance bandwidth of −6 dB of the antenna is 22.96-30.54 GHz, and the antenna exhibits a third-order filter response characteristic. FIG. 19 shows the gain plot of the antenna. The gain of the antenna in the passband is about 7.45 dBi (taking 28.025 GHz as an example), and the gain flatness in the passband is good; there is a radiation zero point on the left and right sides of the passband, respectively at 22.3625 GHz and 32.75 GHz, for the antenna, the stop-band rejection in the upper sideband is better than that in the lower sideband, and the rejection level in the upper sideband is about −31 dB, while the rejection level in the lower sideband is about −20 dB. FIG. 20 and FIG. 21 show the current vector distribution of the filter antenna at 28.025 GHz and 32.75 GHz, respectively, on the radiation patch (i.e., the second conductive patch 1320). The current distribution on the second conductive patch 1320 at 28.025 GHz in the operating frequency band is mainly concentrated on a side near the first side W1, and the distribution is relatively uniform, and the current intensity is the maximum at the second slot 1321. As shown in FIG. 21, at 32.75 GHz in the stop band, the current distribution on the second conductive patch 1320 is very weak except on the second slot 1321, and the currents are in opposite directions and cancel each other out (as shown in FIG. 21, the current directions on the two second conductive patches 1320 located on two sides of the first centerline Q1-Q1 are opposite), and the antenna hardly radiates, and the antenna may have obvious filtering characteristics. The current distribution near the second side W2 of the radiation patch is very weak in FIGS. 20 and 21. Because the second side W2 is far away from the energy coupling gap (i.e. first slot 1211 on the reference ground structure), it hardly participates in the effective radiation of the antenna. It can be seen in FIGS. 20 and 21 that the current distribution at the third slot 1322 is significantly weaker than that at the second slot 1321. Thus, it can be illustrated that the influence of the third slot 1322 on antenna radiation is very weak and is negligible compared with the second slot 1321, and the generation of radiation zeros is mainly caused by a pair of second slots 1321.

Figure 22:
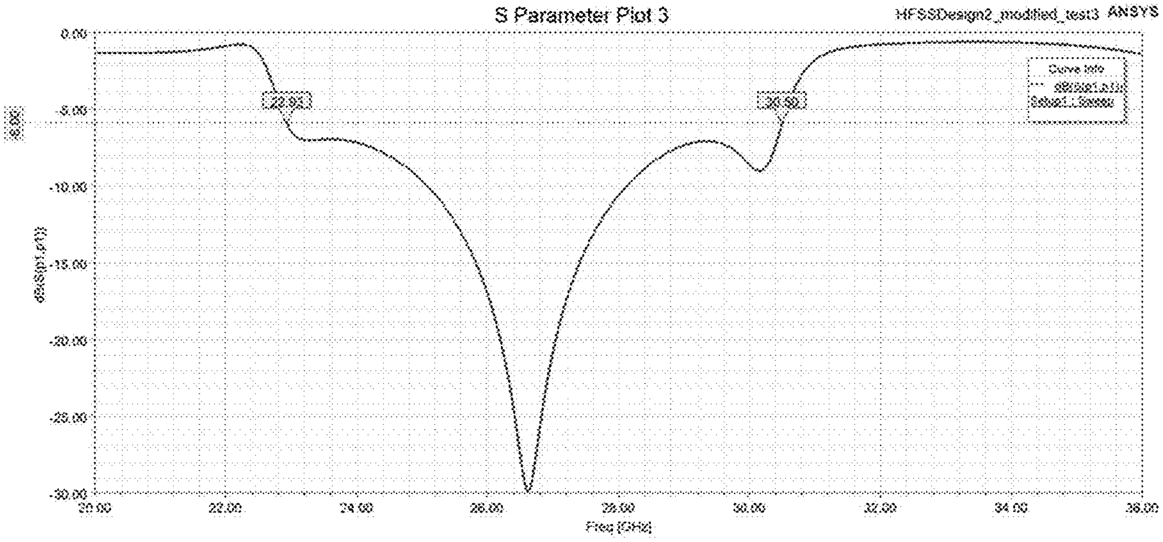
FIG. 22 shows a reflection coefficient S11 plot obtained by simulating the antenna shown in FIG. 3.
Figure 23:
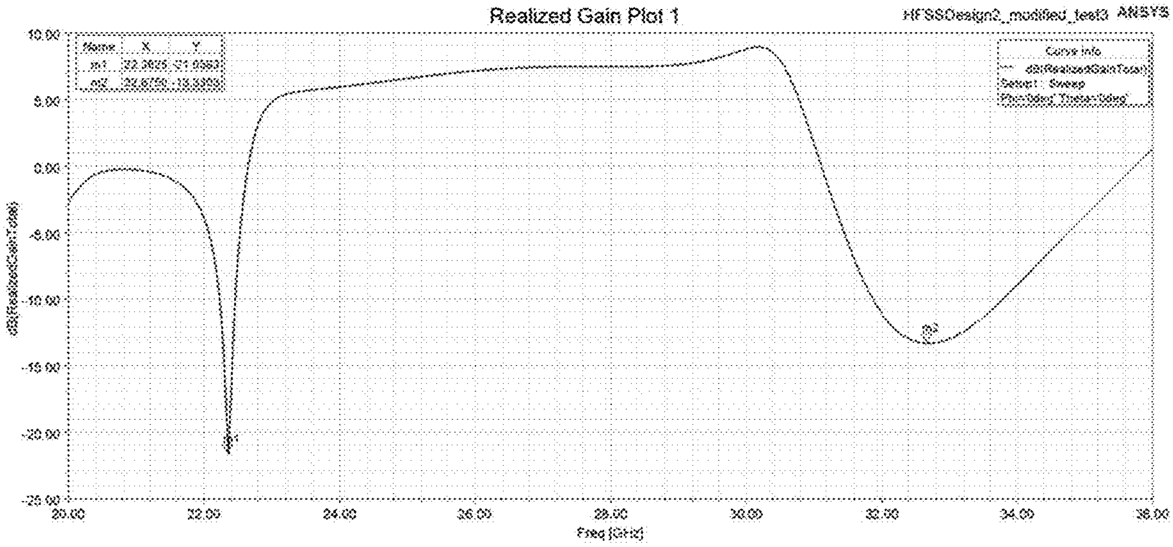
FIG. 23 shows a gain plot obtained by simulating the antenna shown in FIG. 3.
Figure 24:
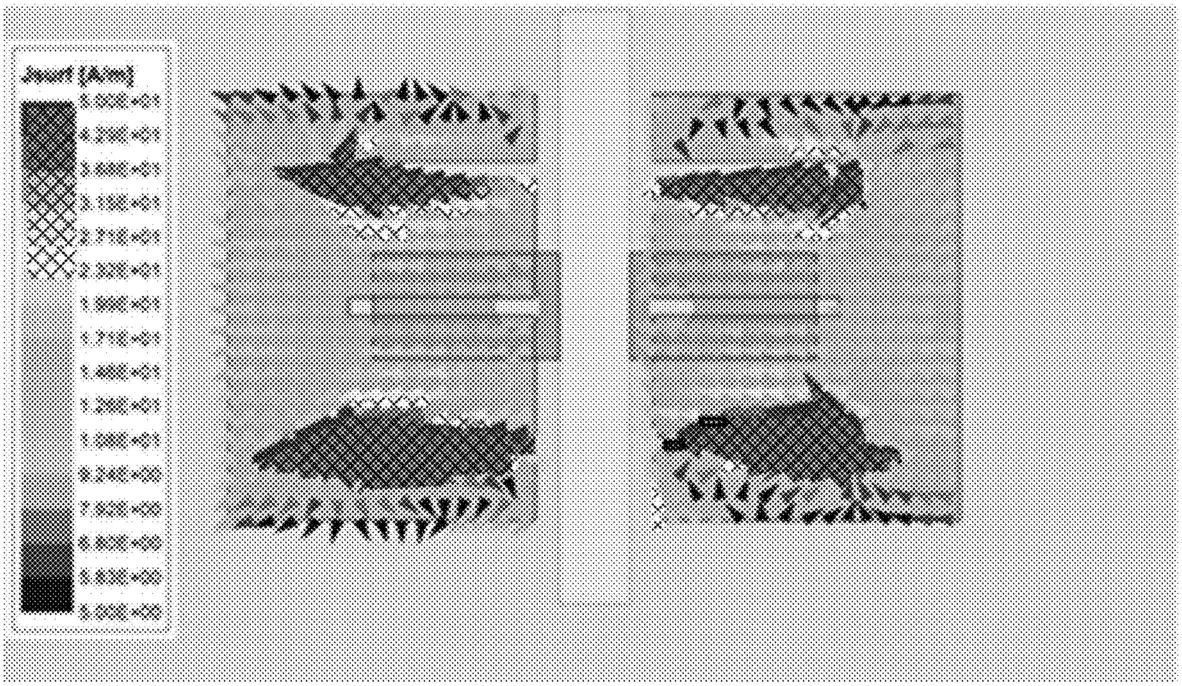
FIG. 24 is a schematic diagram of current vector distribution obtained by simulating the antenna shown in FIG. 3 at an operating frequency.
Figure 25:
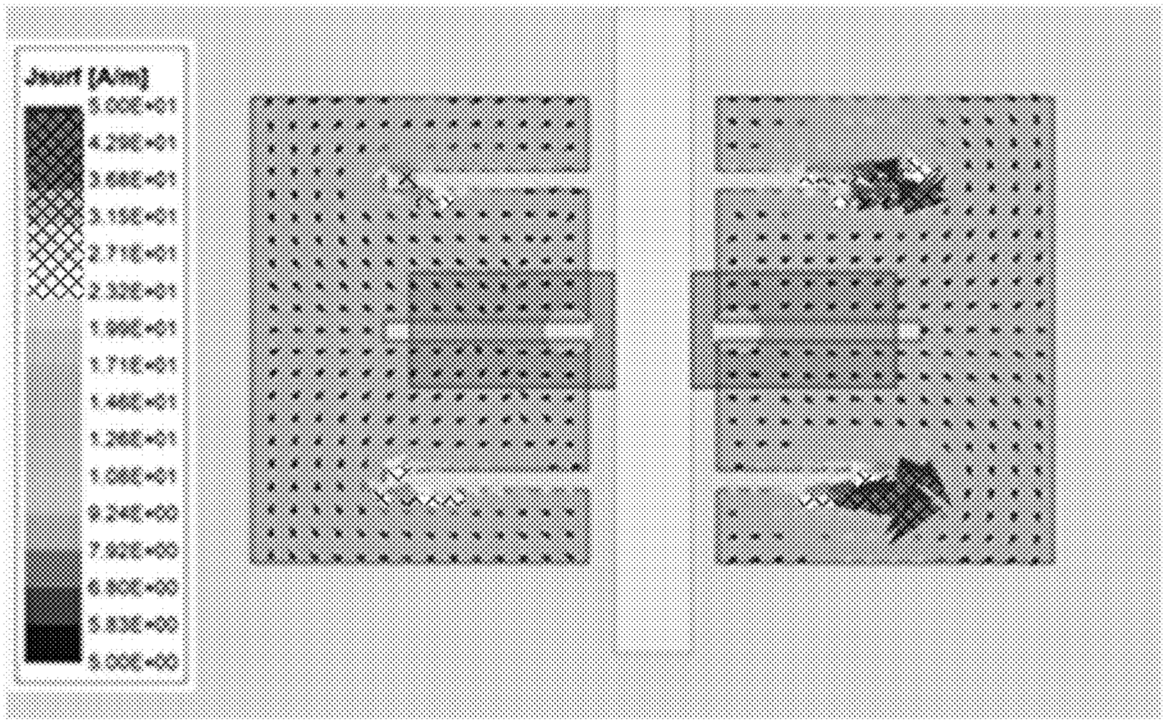
FIG. 25 is a schematic diagram of current vector distribution obtained by simulating the antenna shown in FIG. 3 at a frequency in stopband.

Compared with the antenna structure shown in FIG. 1, the antenna structure shown in FIG. 3 has open ends of both the second slot 1321 and the third slot 1322 provided on the second side W2 of the radiation patch. The simulation results of the antenna structure shown in FIG. 3 are as shown in FIG. 22 to FIG. 25. The reflection coefficient S11 plot of the antenna is shown in FIG. 22. The impedance bandwidth of −6 dB of the antenna is 22.93-30.50 GHz, and the antenna exhibits a third-order filter response characteristic. FIG. 23 shows the gain plot of the antenna. The gain of the antenna in the passband is about 7.45 dBi (taking 28.025 GHz as an example), and the gain flatness in the passband is good; there is a radiation zero point on the left and right sides of the passband, respectively at 22.3625 GHz and 32.675 GHz, for the antenna, the stop-band rejection in the upper sideband is better than that in the lower sideband, and the rejection level in the upper sideband is about −29 dB, while that in the lower sideband is about −21 dB. FIG. 24 and FIG. 25 show the current vector distribution of the filter antenna at 28.025 GHz and 32.675 GHz, respectively, on the radiation patch (i.e., the second conductive patch 1320). As shown in FIG. 24, the current distribution on the second conductive patch 1320 at 28.025 GHz in the operating frequency band is relatively uniform, and the current intensity is the maximum at the second slot 1321, while the current intensity on the first side W1 is slightly higher than that on the second side W2. As shown in FIG. 25, at 32.675 GHz in the stop band, the current distribution on the second conductive patch 1320 is very weak except on the second slot 1321, and the currents are in opposite directions and cancel each other out (as shown in FIG. 25, the current directions on the two second conductive patches 1320 located on two sides of the first centerline Q1-Q1 are opposite), and the antenna hardly radiates, and the antenna may have obvious filtering characteristics. It can be seen that the current distribution at the second slot 1321-1 in the middle in FIGS. 24 and 25 is significantly weaker than that at the second slots 1321-2 at two ends, so it can be illustrated that the second slot 1321-1 has relatively small influence on the antenna radiation compared with the second slot 1321-2, and the generation of radiation zeros is mainly caused by a pair of second slots 1321.

Figure 26:
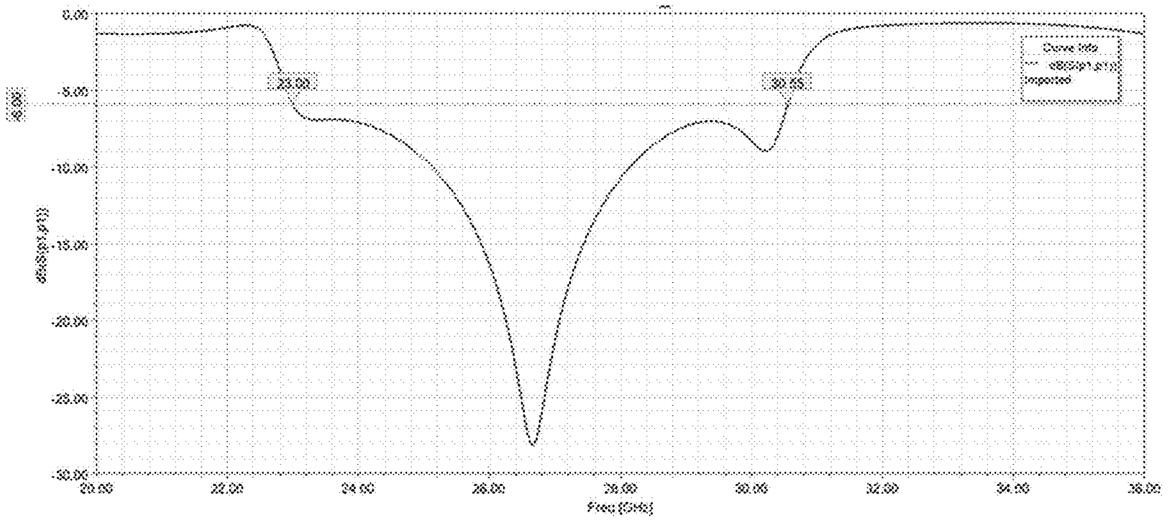
FIG. 26 shows a reflection coefficient S11 plot obtained by simulating the antenna shown in FIG. 4.
Figure 27:
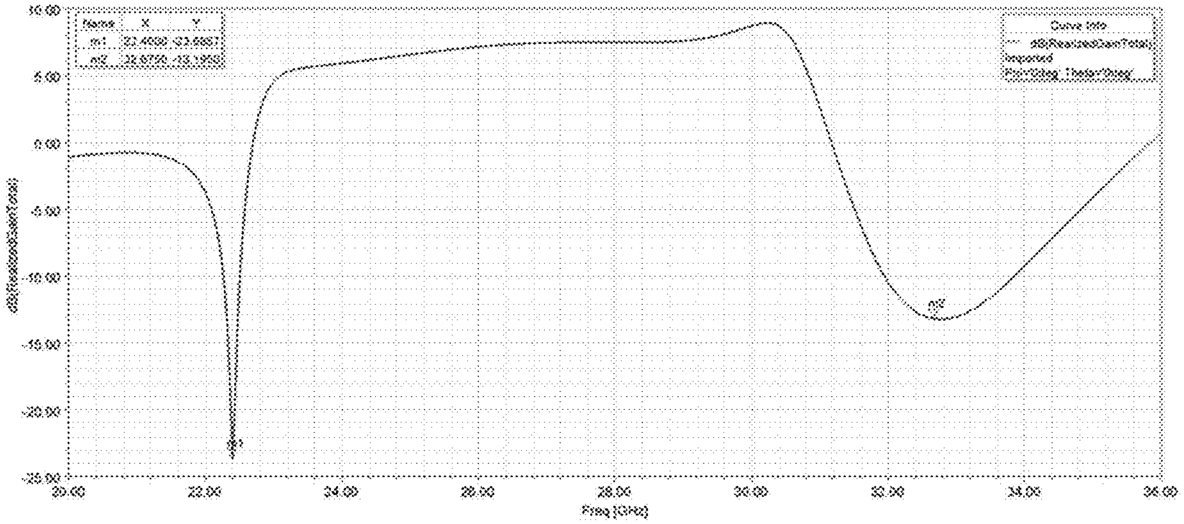
FIG. 27 shows a gain plot obtained by simulating the antenna shown in FIG. 4.
Figure 28:
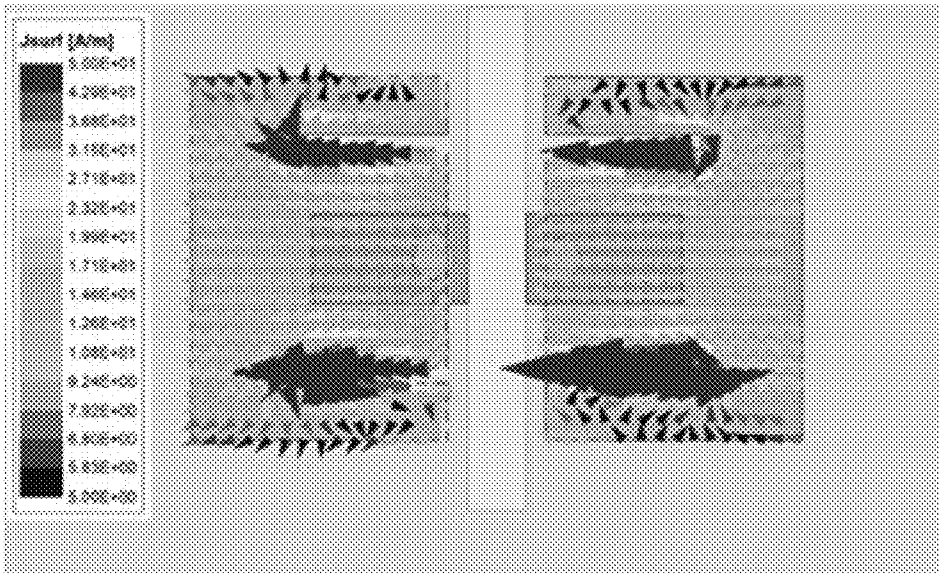
FIG. 28 is a schematic diagram of current vector distribution obtained by simulating the antenna shown in FIG. 4 at an operating frequency.
Figure 29:
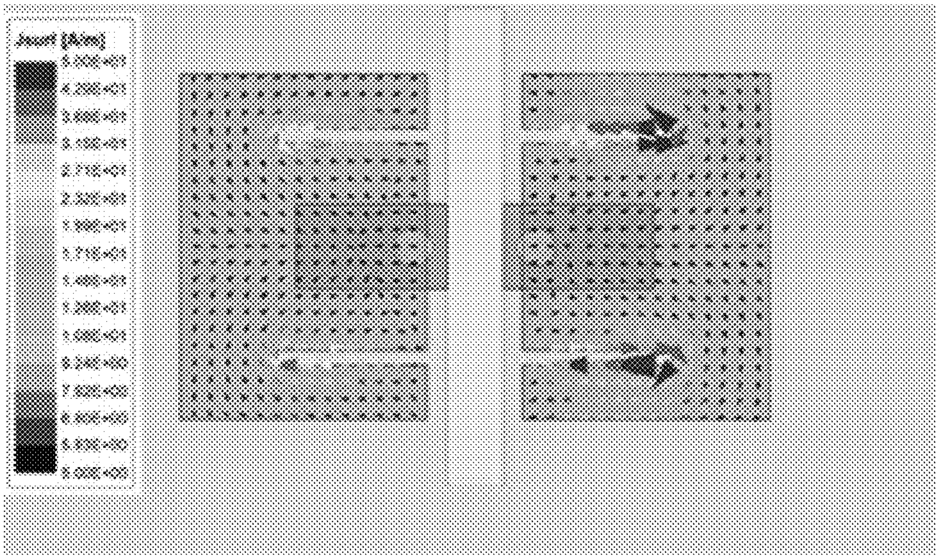
FIG. 29 is a schematic diagram of current vector distribution obtained by simulating the antenna shown in FIG. 4 at a frequency in stopband.

Compared with the antenna structure shown in FIGS. 1 and 3, in the antenna structure shown in FIG. 4, the third slot 1322 is removed. The simulation results of the antenna structure shown in FIG. 4 are shown in FIG. 26 to FIG. 29. The reflection coefficient S11 plot of the antenna is shown in FIG. 26. The impedance bandwidth of −6 dB of the antenna is 23-30.55 GHz, and the antenna exhibits a third-order filter response characteristic. FIG. 27 shows the gain plot of the antenna. The gain of the antenna in the passband is about 7.44 dBi (taking 28.025 GHz as an example), and the gain flatness in the passband is good; there is a radiation zero point on the left and right sides of the passband, respectively at 22.4 GHz and 32.675 Ghz, for the antenna, the stop-band rejection in the upper sideband is better than that in the lower sideband, and the rejection level in the upper sideband is about −31 dB, while that in the lower sideband is about −21 dB. FIG. 28 and FIG. 29 show the current vector distribution of the filter antenna at 28.025 GHz and 33.5 GHz, respectively, on the radiation patch (i.e., the second conductive patch 1320). As shown in FIG. 28, the current distribution on the second conductive patch 1320 at 28.025 GHz in the operating frequency band is relatively uniform, and the current intensity is the maximum at the second slot 1321, while the current intensity on the first side W1 is slightly higher than that on the second side W2. As shown in FIG. 29, at 33.5 GHz in the stop band, the current distribution on the second conductive patch 1320 is very weak except on the second slot 1321, and the currents are in opposite directions and cancel each other out (as shown in FIG. 29, the current directions on the two second conductive patches 1320 located on two sides of the first centerline Q1-Q1 are opposite), and the antenna hardly radiates, and the antenna may have obvious filtering characteristics, and the generation of the radiation zero is caused by a pair of second slots 1321.

Figure 30:
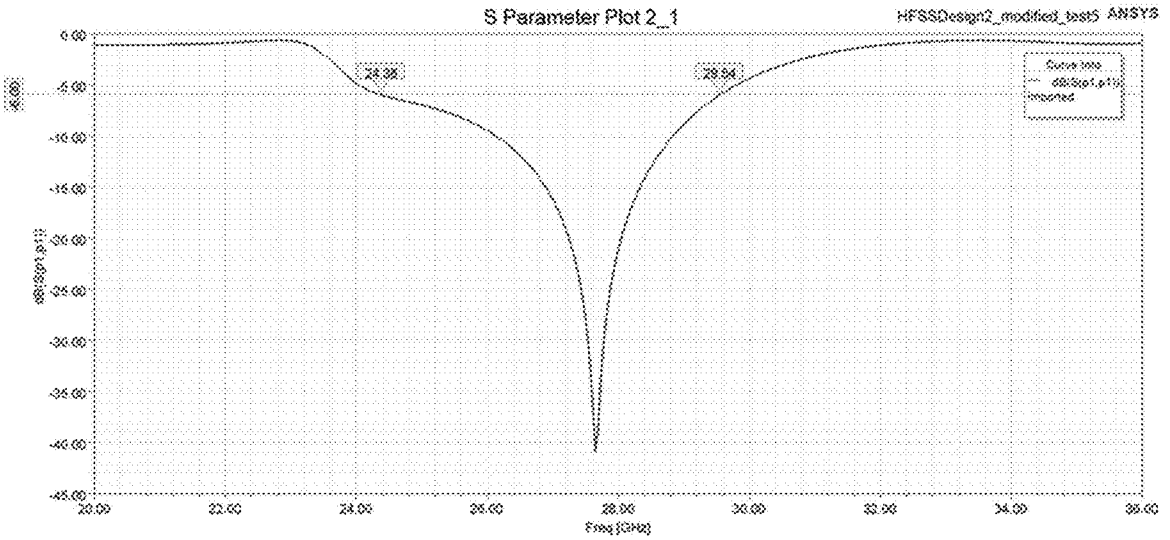
FIG. 30 shows a reflection coefficient S11 plot obtained by simulating the antenna shown in FIG. 5.
Figure 31:
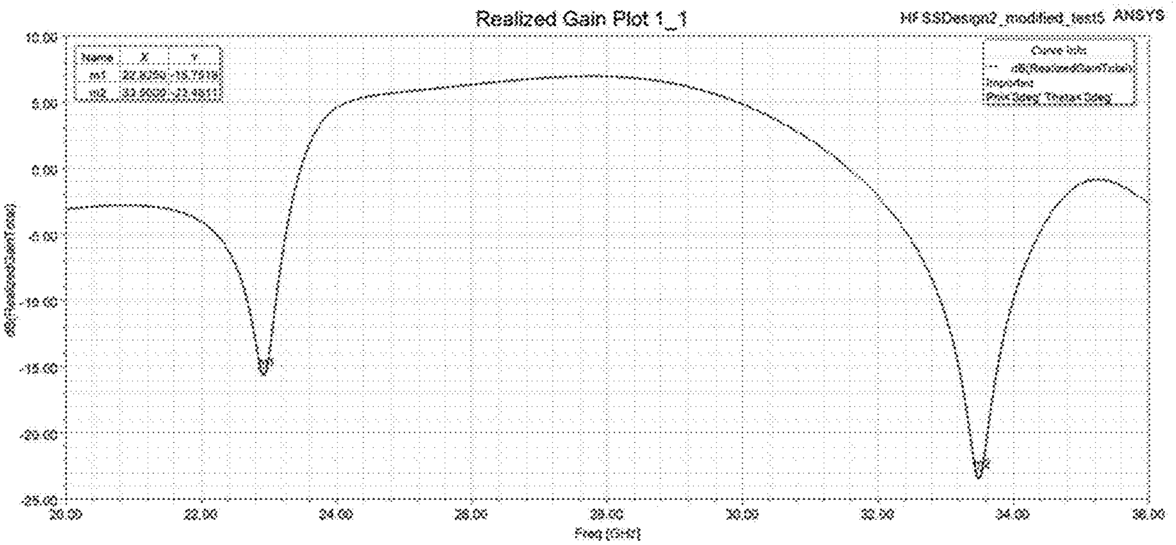
FIG. 31 shows a gain plot obtained by simulating the antenna shown in FIG. 5.
Figure 32:
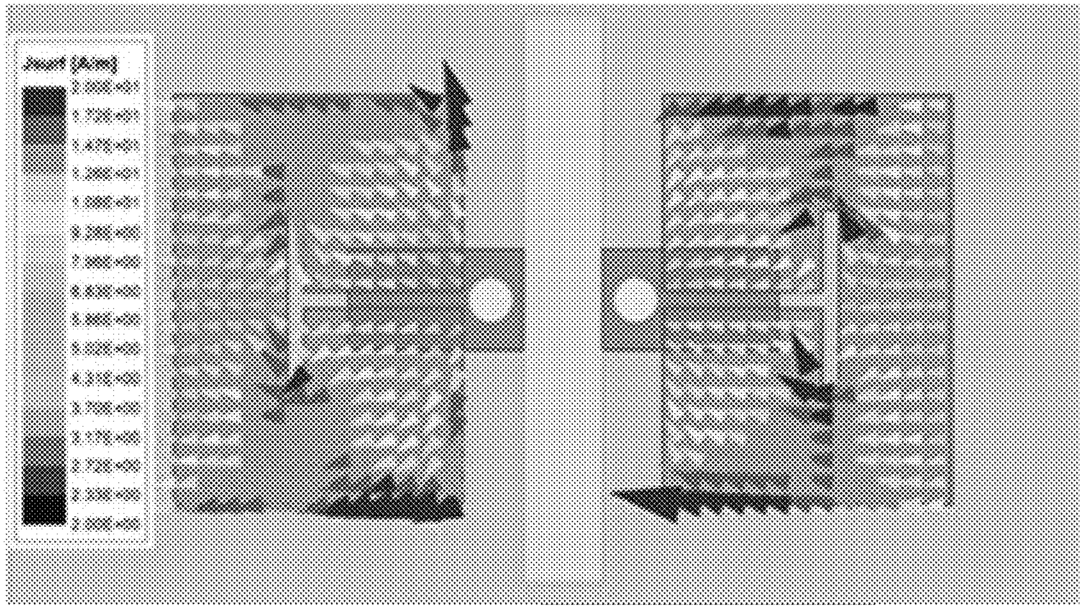
FIG. 32 is a schematic diagram of current vector distribution obtained by simulating the antenna shown in FIG. 5 at an operating frequency.
Figure 33:
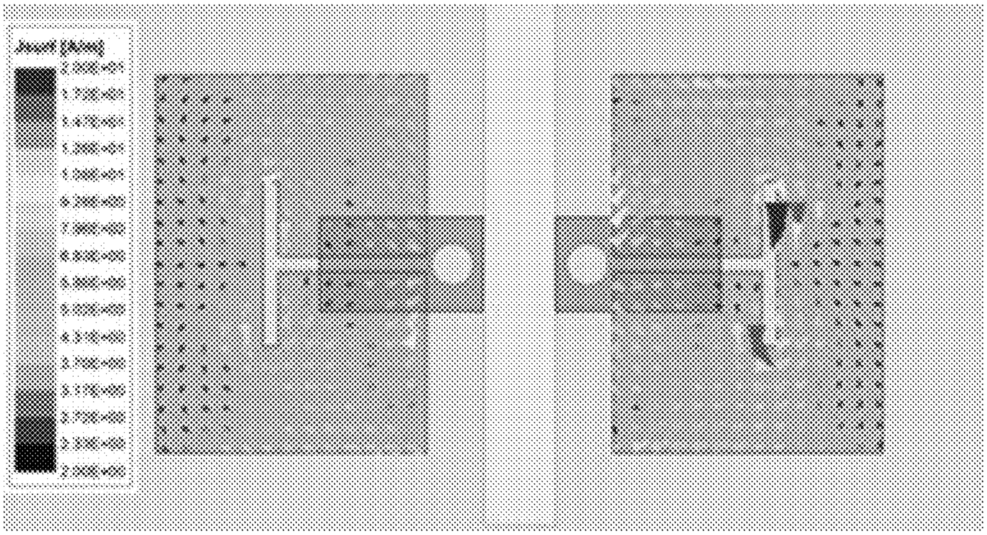
FIG. 33 is a schematic diagram of current vector distribution obtained by simulating the antenna shown in FIG. 5 at a frequency in stopband.

The simulation results of the antenna structure shown in FIG. 5 are as shown in FIG. 30 to FIG. 33. The reflection coefficient S11 plot of the antenna is shown in FIG. 30. The impedance bandwidth of −6 dB of the antenna is 24.38-29.54 GHz, and the antenna exhibits a first-order filter response characteristic. FIG. 31 shows the gain plot of the antenna. The gain of the antenna in the passband is about 6.91 dBi (taking 28.025 GHz as an example), and the gain flatness in the passband decreases slightly, especially near the upper sideband. It can be seen that the roll-off degree of the upper sideband deteriorates. There is a radiation zero point on the left and right sides of the passband, respectively at 22.925 GHz and 33.5 GHz, the stop-band rejection in the upper sideband is worse than that in the lower sideband, and the rejection level in the upper sideband is about −23 dB, while that in the lower sideband is about −30 dB. FIG. 32 and FIG. 33 show the current vector distribution of the filter antenna at 28.025 GHz and 22.925 GHz, respectively, on the radiation patch (i.e., the second conductive patch 1320). As shown in FIG. 32, the current distribution on the second conductive patch 1320 at 28.025 GHz in the operating frequency band is relatively uniform, and the current intensity near the end of the fourth slot 1323 is the maximum, while the current intensity on the first side W1 is not much different from that on the second side W2. As shown in FIG. 33, at 22.925 GHz in the stop band, the current distribution on the second conductive patch 1320 is very weak except at the first side W1 and the fourth slot 1323, and the currents are in opposite directions and cancel each other out (as shown in FIG. 33, the current directions on the two second conductive patches 1320 located on two sides of the first centerline Q1-Q1 are opposite), and the antenna hardly radiates, and the antenna may have obvious filtering characteristics. Compared with the antenna structure shown in FIG. 1, the antenna structure shown in FIG. 5 has a narrower impedance bandwidth, a lower filter response order, a worse roll-off degree of sideband and a worse gain flatness in the channel, but the antenna structure shown in FIG. 5 still maintains good filtering characteristics.

Figure 34:
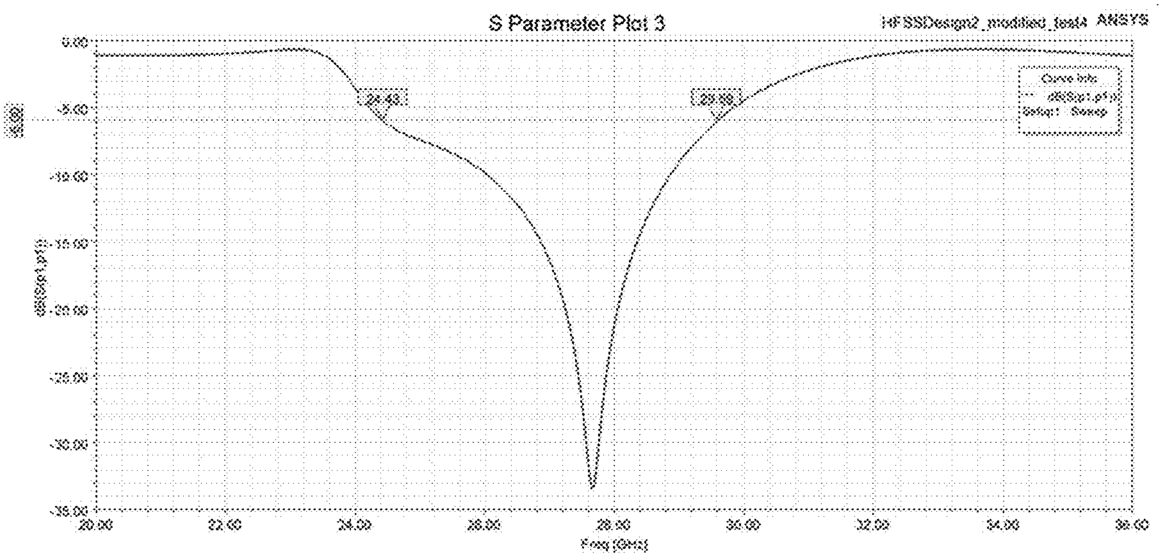
FIG. 34 shows a reflection coefficient S11 plot obtained by simulating the antenna shown in FIG. 7.
Figure 35:
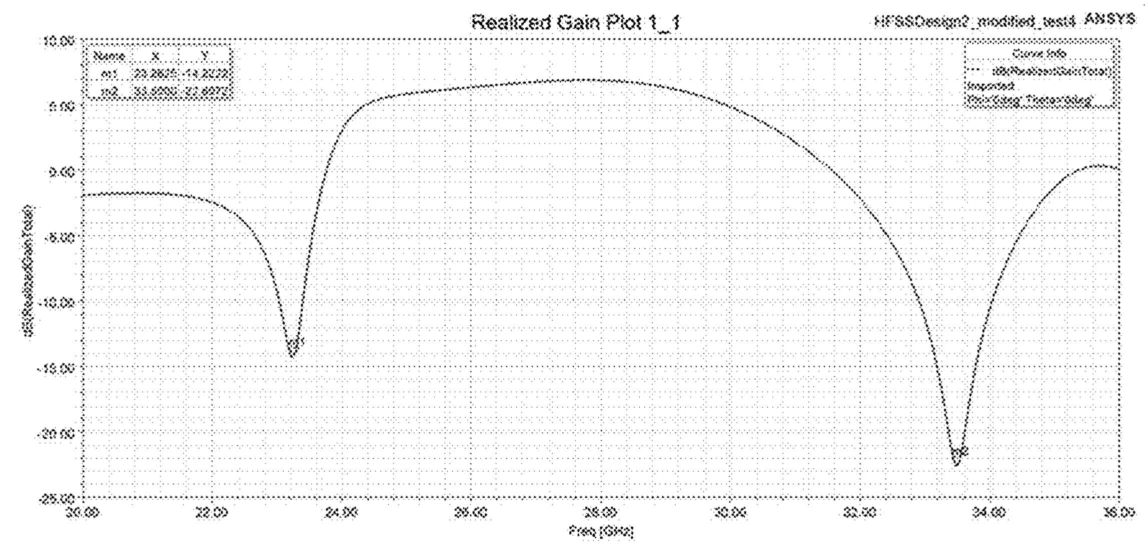
FIG. 35 shows a gain plot obtained by simulating the antenna shown in FIG. 7.
Figure 36:
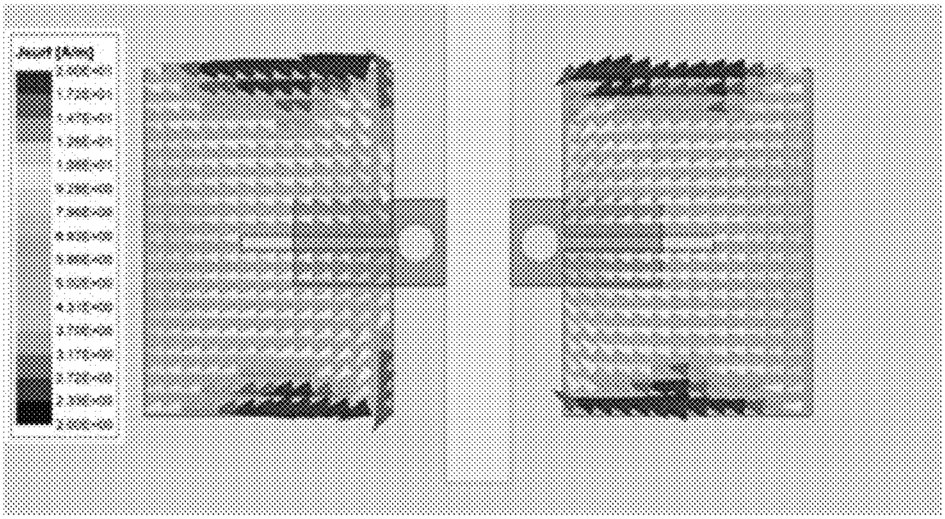
FIG. 36 is a schematic diagram of current vector distribution obtained by simulating the antenna shown in FIG. 7 at an operating frequency.
Figure 37:
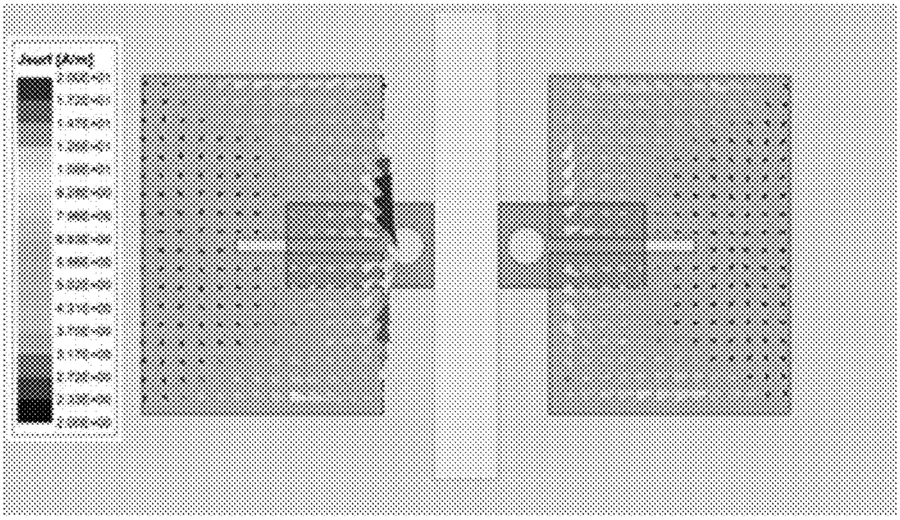
FIG. 37 is a schematic diagram of current vector distribution obtained by simulating the antenna shown in FIG. 7 at a frequency in stopband.

Compared with the antenna structure shown in FIG. 5, the fourth slot 1323 is removed from the antenna structure shown in FIG. 7. The simulation results of the antenna structure shown in FIG. 7 are as shown in FIG. 34 to FIG. 37. The reflection coefficient S11 plot of the antenna is shown in FIG. 34. The impedance bandwidth of −6 dB of the antenna is 24.43-29.59 GHz, and the antenna exhibits a first-order filter response characteristic. FIG. 35 shows the gain plot of the antenna. The gain of the antenna in the passband is about 6.83 dBi (taking 28.025 GHz as an example), and the gain flatness in the passband deteriorates slightly, especially near the upper sideband, and the horizontal deterioration of the roll-off degree of the sideband can be seen; there is a radiation zero point on the left and right sides of the passband, respectively at 23.2625 GHz and 33.5 Ghz, the stop-band rejection in the upper sideband is worse than that in the lower sideband, and the rejection level in the upper sideband is about −21 dB, while that in the lower sideband is about −29 dB. FIG. 36 and FIG. 37 show the current vector distribution of the filter antenna at 28.025 GHz and 23.2625 GHz, respectively, on the radiation patch (i.e., the second conductive patch 1320). As shown in FIG. 36, the current distribution on the second conductive patch 1320 at 28.025 GHz in the operating frequency band is relatively uniform, and the maximum current is on two sides of the second conductive patch 1320 along the second direction Y. As shown in FIG. 37, at 23.2625 GHz in the stop band, the current distribution on the second conductive patch 1320 is very weak except at the first side W1, and the currents are opposite in directions and cancel each other out (as shown in FIG. 37, the current directions on the two second conductive patches 1320 located on two sides of the first centerline Q1-Q1 are opposite), and the antenna hardly radiates, and the antenna may have obvious filtering characteristics. It can be seen from this that after the fourth slot 1323 in the antenna structure shown in FIG. 5 is removed; the performance of the antenna does not change significantly.

Figure 38:
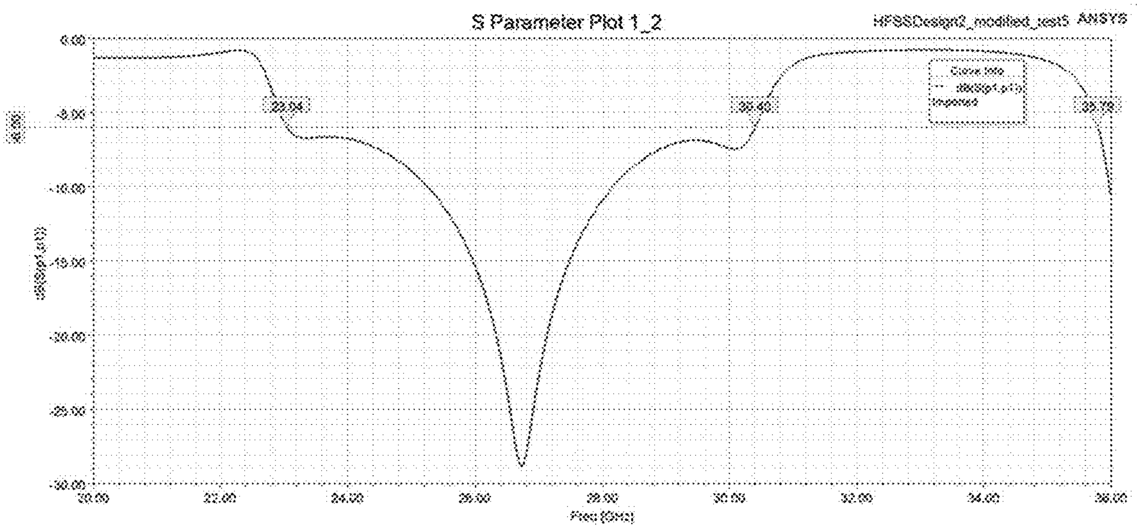
FIG. 38 shows a reflection coefficient S11 plot obtained by simulating the antenna shown in FIG. 9.
Figure 39:
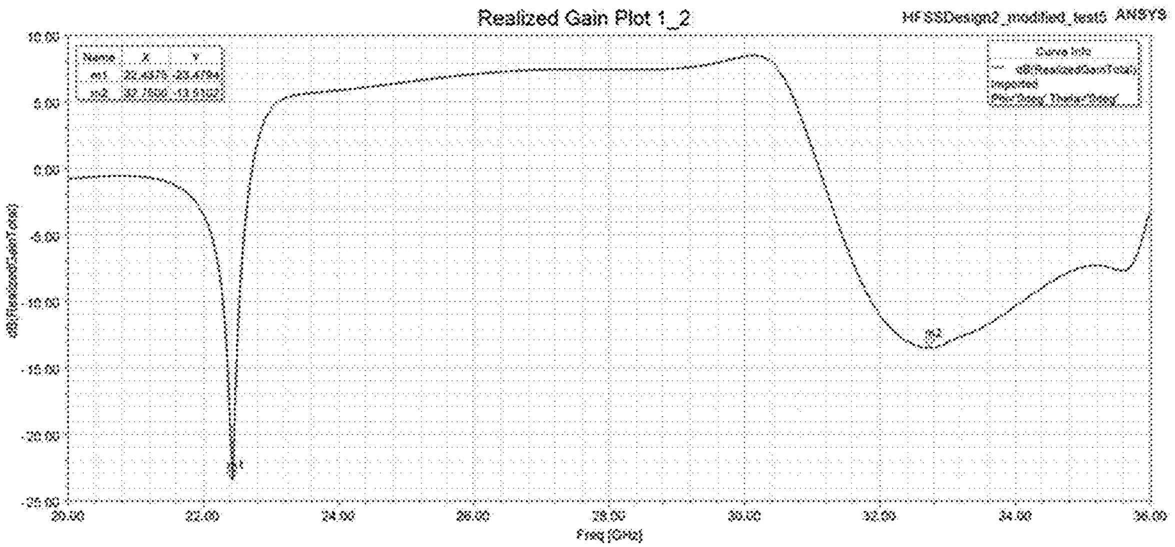
FIG. 39 shows a gain plot obtained by simulating the antenna shown in FIG. 9.
Figure 40:
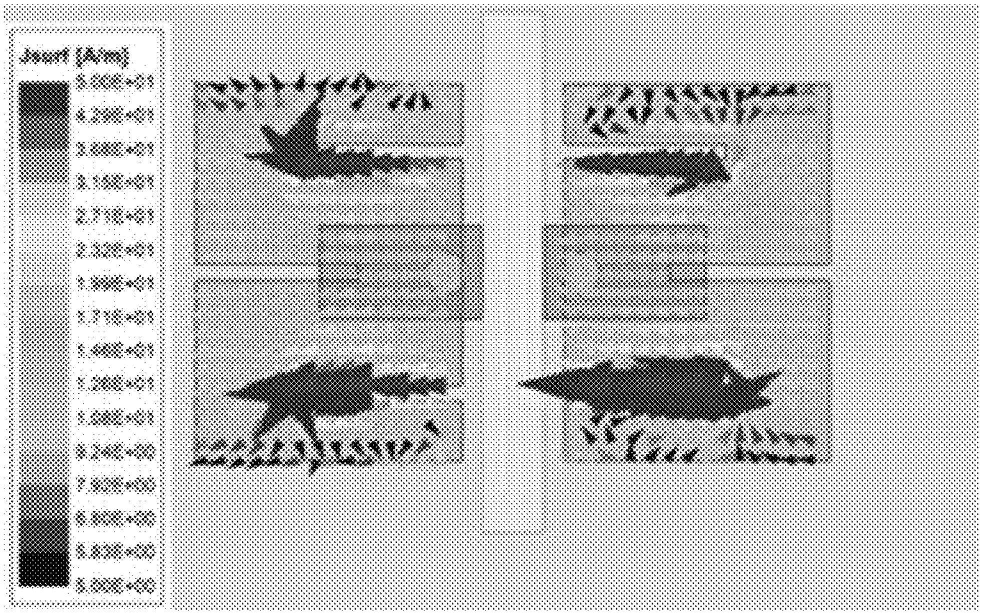
FIG. 40 is a schematic diagram of current vector distribution obtained by simulating the antenna shown in FIG. 9 at an operating frequency.
Figure 41:
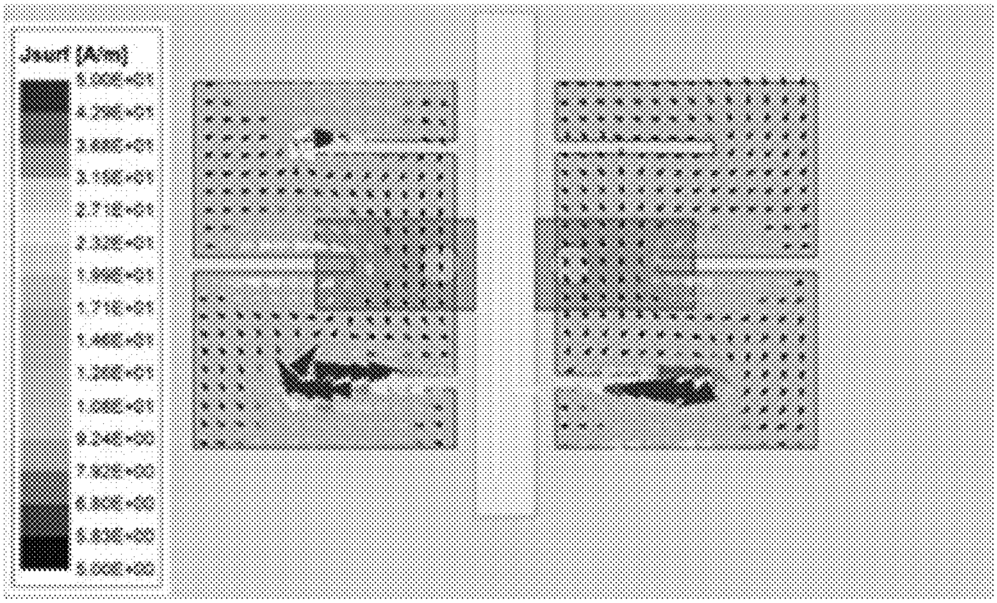
FIG. 41 is a schematic diagram of current vector distribution obtained by simulating the antenna shown in FIG. 9 at a frequency in stopband.

Compared with the antenna configuration shown in FIG. 1, in the antenna shown in FIG. 9, two bent branches are introduced in the first slot 1211. The simulation results of the antenna structure shown in FIG. 9 are as shown in FIG. 38 to FIG. 41. The reflection coefficient S11 plot of the antenna is shown in FIG. 38. The impedance bandwidth of −6 dB of the antenna is 23.04-30.4 GHz, and the antenna exhibits a third-order filter response characteristic. FIG. 39 shows the gain plot of the antenna. The gain of the antenna in the passband is about 7.41 dBi (taking 28.025 GHz as an example), and the gain flatness in the passband is good; there is a radiation zero point on the left and right sides of the passband, respectively at 22.4375 GHz and 32.75 Ghz, for the antenna, the stop-band rejection in the upper sideband is better than that in the lower sideband, and the rejection level in the upper sideband is about −31 dB, while that in the lower sideband is about −21 dB. FIG. 40 and FIG. 41 show the current vector distribution of the filter antenna at 28.025 GHz and 32.75 GHz, respectively, on the radiation patch (i.e., the second conductive patch 1320). As shown in FIG. 40, the current distribution on the second conductive patch 1320 at 28.025 GHz in the operating frequency band is relatively uniform, and the current intensity is the maximum at the second slot 1321, while the current intensity on the first side W1 is slightly higher than that on the second side W2. As shown in FIG. 41, at 32.75 GHz in the stop band, the current distribution on the second conductive patch 1320 is very weak except on the second slot 1321, and the currents are in opposite directions and cancel each other out (as shown in FIG. 41, the current directions on the two second conductive patches 1320 located on two sides of the first centerline Q1-Q1 are opposite), and the antenna hardly radiates, and the antenna may have obvious filtering characteristics, and the generation of the radiation zero is mainly caused by a pair of second slots 1321.

Figure 42:
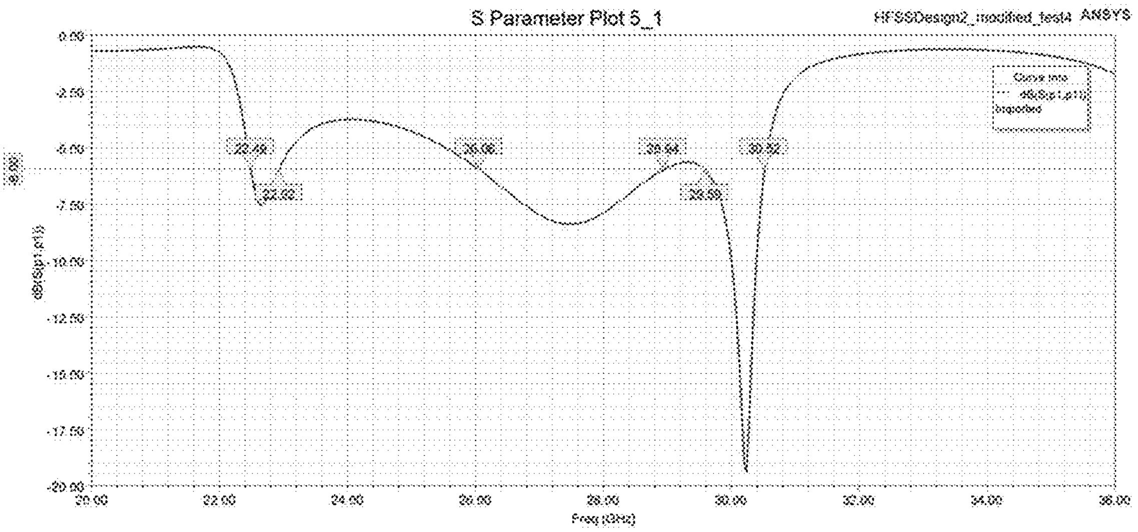
FIG. 42 shows a reflection coefficient S11 plot obtained by simulating the antenna shown in FIG. 13.
Figure 43:
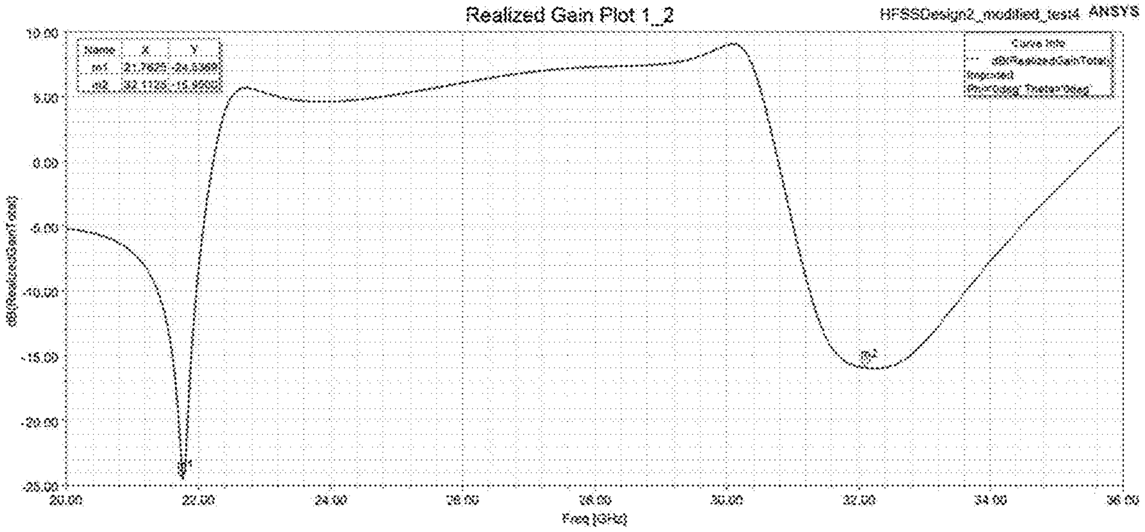
FIG. 43 shows a gain plot obtained by simulating the antenna shown in FIG. 13.
Figure 44:
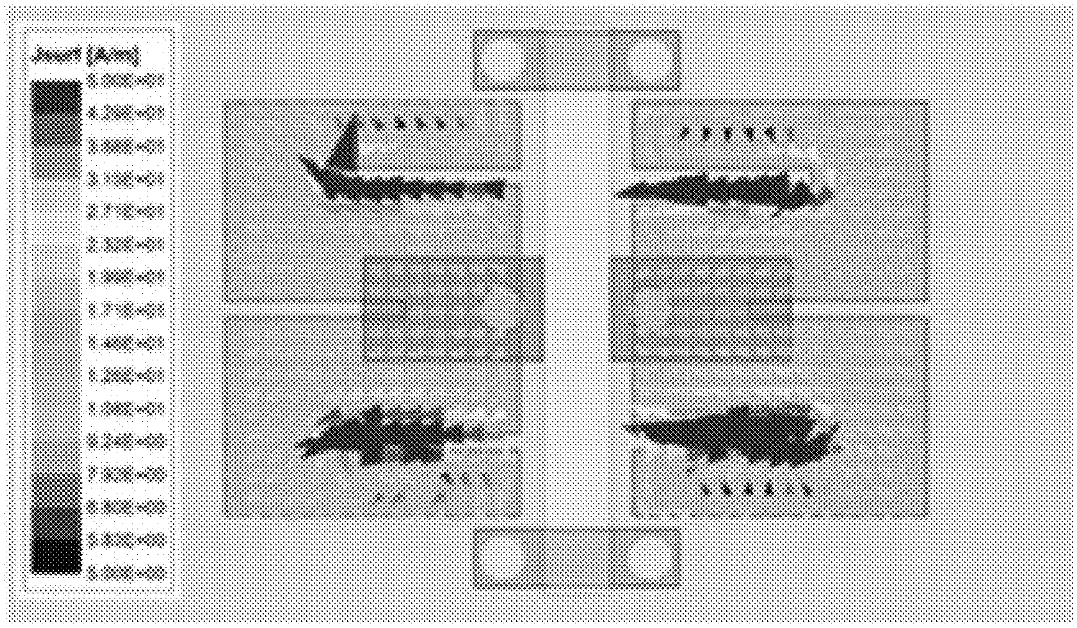
FIG. 44 is a schematic diagram of current vector distribution obtained by simulating the antenna shown in FIG. 13 at an operating frequency.
Figure 45:
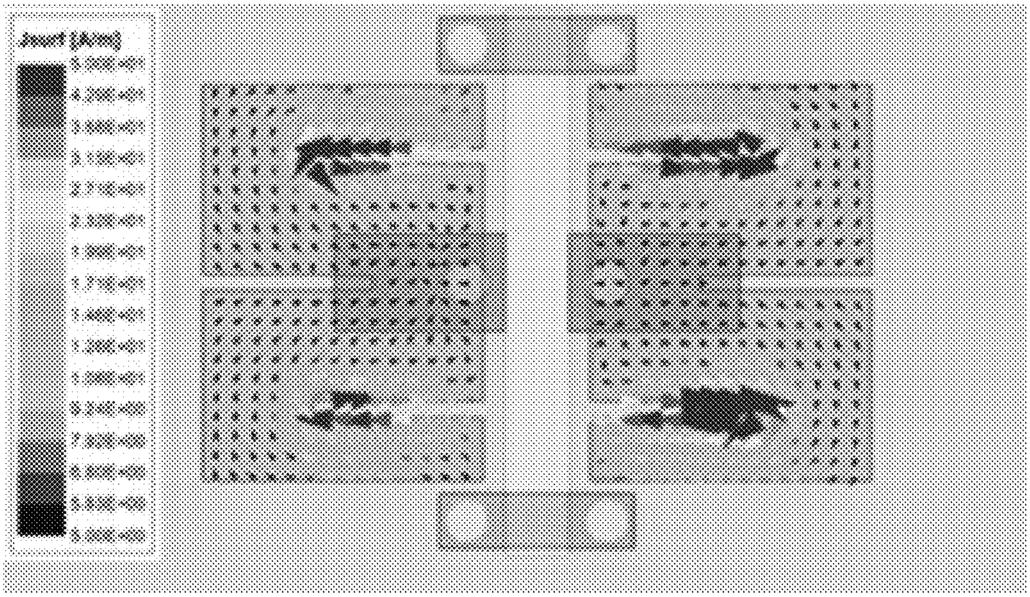
FIG. 45 is a schematic diagram of current vector distribution obtained by simulating the antenna shown in FIG. 13 at a frequency in stopband.

The simulation results of the antenna structure shown in FIG. 13 are as shown in FIG. 42 to FIG. 45. The reflection coefficient S11 plot of the antenna is shown in FIG. 42. The impedance bandwidth of −6 dB of the antenna turns into several segments, which is no longer a continuous bandwidth antenna return loss response, but the antenna still exhibits a third-order filter response characteristic. FIG. 43 shows the gain plot of the antenna. The gain of the antenna in the passband is about 7.26 dBi (taking 28.025 GHz as an example), and the gain flatness in the passband is good; there is a radiation zero point on the left and right sides of the passband, respectively at 21.7625 GHz and 32.1125 Ghz, for the antenna, the stop-band rejection in the upper sideband is better than that in the lower sideband, and the rejection level in the upper sideband is about −32 dB, while that in the lower sideband is about −23 dB. FIG. 44 and FIG. 45 show the current vector distribution of the filter antenna at 28.025 GHz and 32.1125 GHz, respectively, on the radiation patch (i.e., the second conductive patch 1320). As shown in FIG. 44, the current distribution on the second conductive patch 1320 at 28.025 GHz in the operating frequency band is relatively uniform, and the current intensity is the maximum at the second slot 1320, while the current intensity on the first side W1 is slightly higher than that on the second side W2. As shown in FIG. 45, at 32.1125 GHz in the stop band, the current distribution on the second conductive patch 1320 is very weak except on the second slot 1321, and the currents are in opposite directions and cancel each other out (as shown in FIG. 45, the current directions on the two second conductive patches 1320 located on two sides of the first centerline Q1-Q1 are opposite), and the antenna hardly radiates, and the antenna may have obvious filtering characteristics. The short-circuit post structure obviously changes the return loss performance of the antenna, but has no obvious influence on the filtering characteristics of the antenna.

Figure 46:
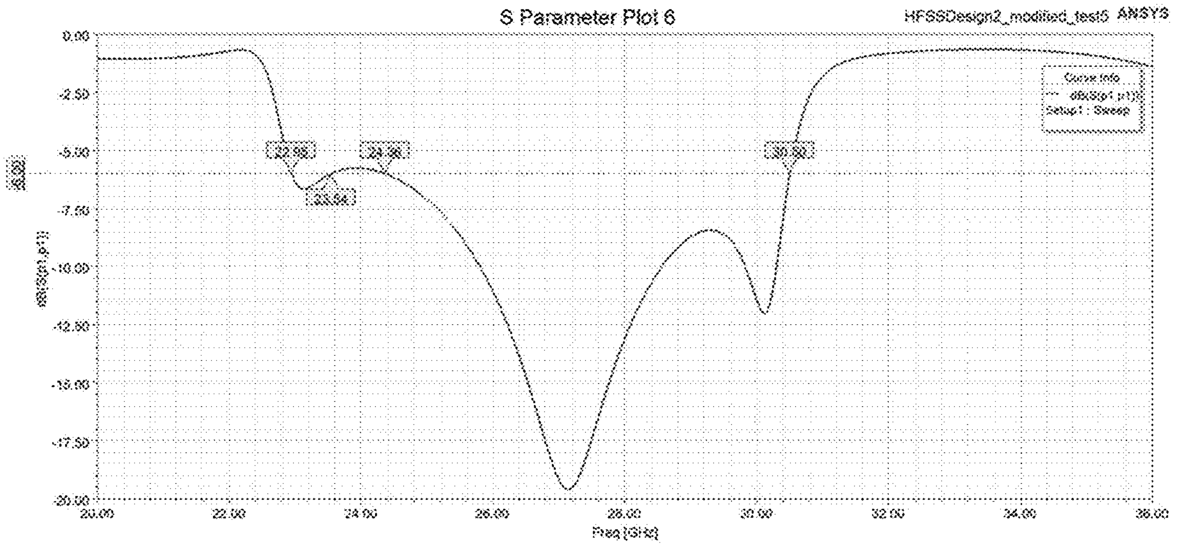
FIG. 46 shows a reflection coefficient S11 plot obtained by simulating the antenna shown in FIG. 16.
Figure 47:
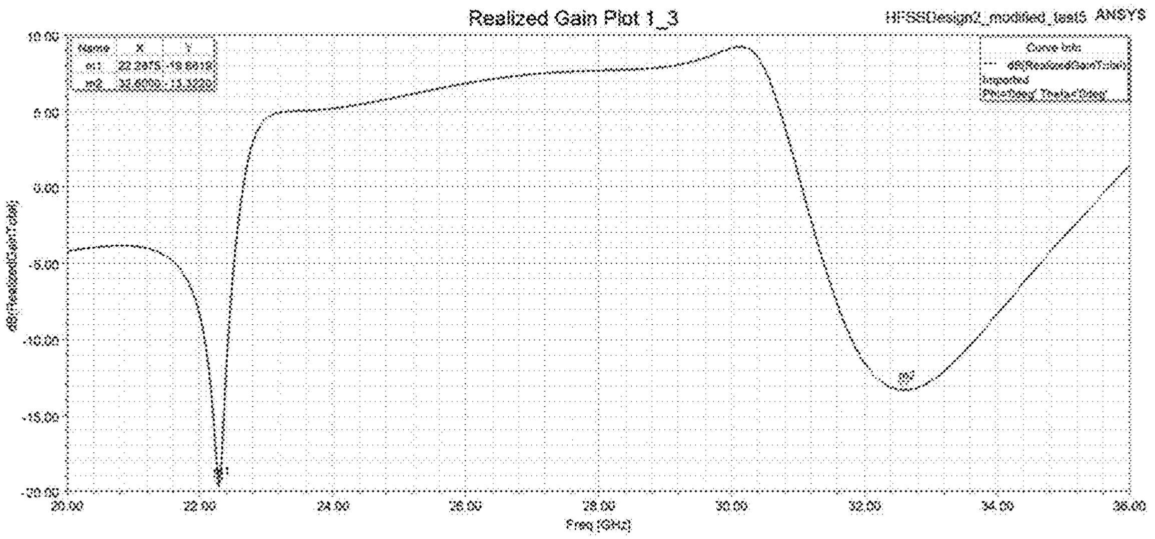
FIG. 47 shows a gain plot obtained by simulating the antenna shown in FIG. 16.
Figure 48:
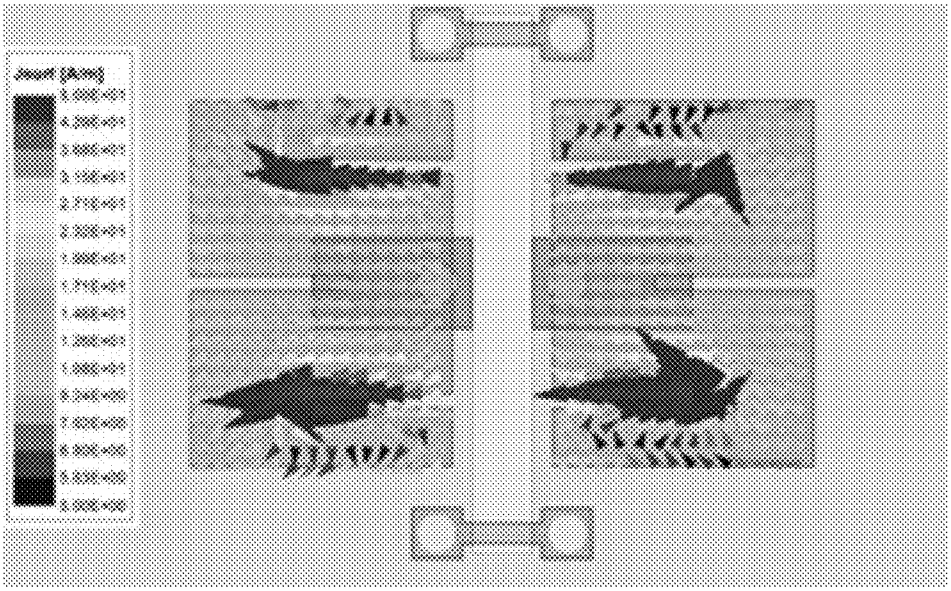
FIG. 48 is a schematic diagram of current vector distribution obtained by simulating the antenna shown in FIG. 16 at an operating frequency.
Figure 49:
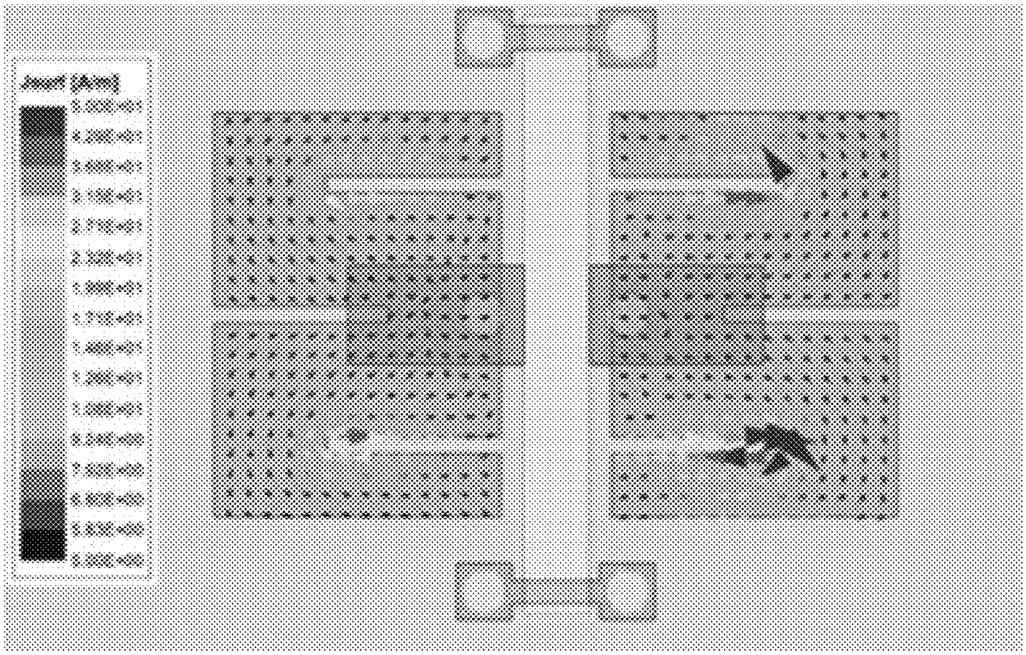
FIG. 49 is a schematic diagram of current vector distribution obtained by simulating the antenna shown in FIG. 16 at a frequency in stopband.
Figure 50:
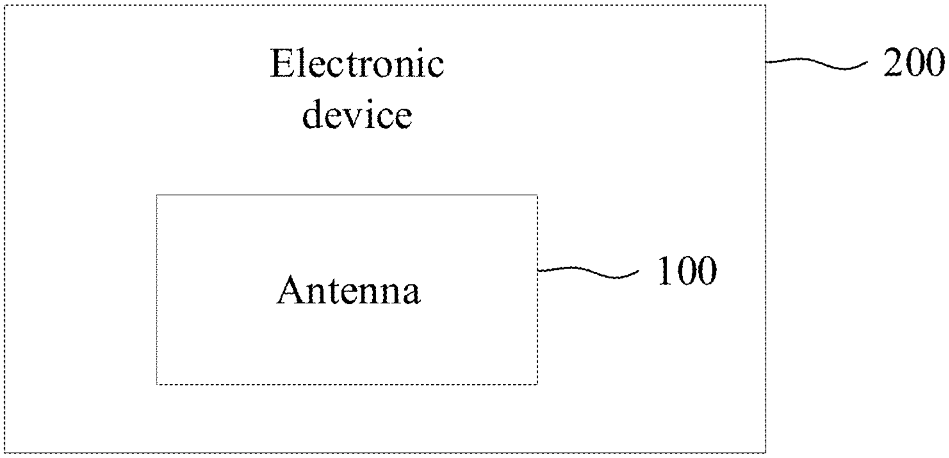
FIG. 50 is a schematic diagram of an electronic device according to an embodiment of the present disclosure.

The simulation results of the antenna structure shown in FIG. 16 are as shown in FIG. 46 to FIG. 49. The reflection coefficient S11 plot of the antenna is shown in FIG. 46. The impedance bandwidth of −6 dB of the antenna is 24.36-30.50 GHz, and the antenna exhibits a third-order filter response characteristic. FIG. 47 shows the gain plot of the antenna. The gain of the antenna in the passband is about 7.65 dBi (taking 28.025 GHz as an example), and the gain flatness in the passband is good; there is a radiation zero point on the left and right sides of the passband, respectively at 22.2875 GHz and 32.6 Ghz, for the antenna, the stop-band rejection in the upper sideband is better than that in the lower sideband, and the rejection level in the upper sideband is about −27 dB, while that in the lower sideband is about −21 dB. FIG. 48 and FIG. 49 show the current vector distribution of the filter antenna at 28.025 GHz and 21.7625 GHz, respectively, on the radiation patch (i.e., the second conductive patch 1320). As shown in FIG. 48, the current distribution on the second conductive patch 1320 at 28.025 GHz in the operating frequency band is relatively uniform, and the current intensity is the maximum at the second slot 1320, while the current intensity on the first side W1 is slightly higher than that on the second side W2. As shown in FIG. 49, at 21.7625 GHz in the stop band, the current distribution on the second conductive patch 1320 is very weak except on the second slot 1321, and the currents are in opposite directions and cancel each other out (as shown in FIG. 49, the current directions on the two second conductive patches 1320 located on two sides of the first centerline Q1-Q1 are opposite), and the antenna hardly radiates, and the antenna may have obvious filtering characteristics. The fine adjustment of the short-circuit post structure obviously improves the return loss performance of the antenna, and the antenna becomes a broadband antenna again, but it has no obvious influence on the filtering characteristics of the antenna. An embodiment of the present disclosure further provides an electronic device. As shown in FIG. 50, the electronic device 200 includes the antenna 100 described in any of the above embodiments.

In an embodiment of the present disclosure, the electronic device 200 may be any product or component having an antenna in any of the above embodiments such as a display apparatus, a wearable device, radar, a satellite or the like.

The drawings of the embodiments of the present disclosure only involve structures involved in the embodiments of the present disclosure, and other structures may refer to usual designs.

The embodiments of the present disclosure, that is, features in the embodiments, may be combined with each other to obtain new embodiments if there is no conflict.

Although the implementation modes disclosed in the embodiments of the present disclosure are described above, the described contents are only implementation modes for facilitating understanding of the embodiments of the present disclosure, which are not intended to limit the embodiments of the present disclosure. Those of skilled in the art to which the embodiments of the present disclosure pertain may make any modifications and variations in forms and details of implementation without departing from the spirit and scope disclosed in the embodiments of the present disclosure. Nevertheless, the scope of patent protection of the embodiments of the present disclosure should still be subject to the scope defined by the appended claims.

The invention claimed is:

1. An antenna comprising: a first feed layer, a second feed layer, and a radiation structure layer which are stacked; wherein the first feed layer comprises a first dielectric substrate and a micro-strip line structure which are stacked, wherein the micro-strip line structure is arranged on a side of the first dielectric substrate away from the second feed layer;

the second feed layer comprises a reference ground structure, a second dielectric substrate, and a first conductive structure which are stacked, the reference ground structure is arranged on a side of the second dielectric substrate facing the first feed layer, the first conductive structure is arranged on a side of the second dielectric substrate away from the first feed layer, the first conductive structure comprises a plurality of first conductive patches, a plurality of electrical connection structures are provided on the second dielectric substrate, and the plurality of first conductive patches are respectively electrically connected with the reference ground structure through the plurality of electrical connection structures;

the reference ground structure is provided with a first slot, and in a plane where the first conductive structure is located, the plurality of first conductive patches are symmetrically arranged with respect to a first centerline, wherein the first centerline is a centerline of the first slot extending along a second direction, and a first direction is orthogonal to the second direction;

the radiation structure layer comprises a third dielectric substrate and a second conductive structure which are stacked, the second conductive structure is arranged on a side of the third dielectric substrate away from the second feed layer, the second conductive structure comprises a plurality of second conductive patches, in a plane where the second conductive structure is located, the plurality of second conductive patches are symmetrically arranged with respect to the first centerline, each of the plurality of second conductive patches is provided with at least one second slot, and a plurality of second slots on the plurality of second conductive patches are symmetrically arranged with respect to the first centerline along the first direction, and the plurality of second slots extend to an edge of a side of the plurality of second conductive patches close to the first centerline;

wherein the plurality of first conductive patches in the first conductive structure comprise two first conductive patches, and the two first conductive patches are arranged along the first direction;

the plurality of second conductive patches in the second conductive structure comprise two second conductive patches, and the two second conductive patches are arranged along the first direction;

the plurality of electrical connection structures comprise two electrical connection structures;

wherein, in a plane where the radiation structure layer is located, the two second conductive patches are symmetrically arranged with respect to a second centerline, and the second centerline is a centerline of a center of the antenna extending along the first direction;

the at least one second slot on each of the plurality of second conductive patches is symmetrically arranged along the second direction with respect to the second centerline;

wherein each of the two second conductive patches is further provided with a third slot, and in a plane where the radiation structure layer is located, the third slot is symmetrically arranged with respect to the second centerline along the second direction;

the third slot extends to an edge of a side of each of the plurality of second conductive patches away from the first centerline; and each third slot on the two second conductive patches is symmetrically arranged with respect to the first centerline along the first direction.

2. The antenna according to claim 1, wherein an orthographic projection of the micro-strip line structure on a plane where the first dielectric substrate is located is at least partially overlapped with orthographic projections of the plurality of the first conductive patches, the plurality of the second conductive patches, and the first slot on the first dielectric substrate.

3. The antenna according to claim 2, wherein the micro-strip line structure is symmetrically arranged along the second direction with respect to a second centerline in a plane where the first feed layer is located, and the second centerline is a centerline of a center of the antenna extending along the first direction;

in the plane where the first feed layer is located, the first micro-strip line structure has a size of 6 mm to 10 mm in the first direction, and the first micro-strip line structure has a size of 0.8 mm to 1.4 mm in the second direction.

4. The antenna according to claim 1, wherein each of the two electric connection structures and a corresponding first conductive patch of the two first conductive patches form an L-shaped probe, the two electric connection structures and the two first conductive patches form two L-shaped probes, in a plane where the second feed layer is located, two L-shaped probes are symmetrically arranged with respect to the first centerline along the first direction, the two L-shaped probes are symmetrically arranged with respect to a second centerline, and the second centerline is a centerline of a center of the antenna extending along the first direction.

5. The antenna according to claim 1, wherein a number of the second slots on the same second conductive patch is one to three.

6. The antenna according to claim 1, wherein in the plane where the radiation structure layer is located, the plurality of second slots and the two third slots each has a size of 1 mm to 2 mm in the first direction and the plurality of second slots and the two third slots each has a size of 0.1 mm to 0.2 mm in the second direction.

7. The antenna according to claim 1, wherein on each of the plurality of second conductive patches, the plurality of second slots comprise two second slots, and the two second slots are arranged symmetrically with respect to the third slot along the second direction.

8. The antenna according to claim 1, wherein the first slot is further provided with a branch structure connected to the reference ground structure.

9. The antenna according to claim 8, wherein the branch structure comprises a first branch structure and a second branch structure; the first branch structure and the second branch structure are arranged along the first direction and are arranged on two sides of the first centerline;

the first branch structure comprises a first connection line and a second connection line, wherein the first connection line extends along the first direction, an end of the first connection line away from the first centerline is connected with the reference ground structure, and an end of the first connection line close to the first centerline is connected with the second connection line; a first end of the second connection line is connected with the first connection line, and a second end of the second connection line extends along the second direction;

the second branch structure comprises a third connection line and a fourth connection line, wherein the third connection line extends along the first direction, an end of the third connection line away from the first centerline is connected with the reference ground structure, and an end of the third connection line close to the first centerline is connected with the fourth connection line; and a first end of the fourth connection line is connected with the third connection line, and a second end of the fourth connection line extends along the second direction.

10. The antenna according to claim 1, wherein the second feed layer further comprises a first short-circuit connection structure and a second short-circuit connection structure arranged in a same layer as the first conductive structure, and the second dielectric substrate is further provided with two first short-circuit connection posts and two second short-circuit connection posts;

the first short-circuit connection structure achieves a short-circuit connection with the reference ground structure through the two first short-circuit connection posts, and the second short-circuit connection structure achieves a short-circuit connection with the reference ground structure through the two second short-circuit connection posts.

11. The antenna according to claim 10, wherein the first short-circuit connection structure and the second short-circuit connection structure are both symmetrically arranged with respect to the first centerline, and the first short-circuit connection structure and the second short-circuit connection structure are located on two sides of the first conductive structure along the second direction and are symmetrically arranged with respect to a second centerline, wherein the second centerline is a centerline of a center of the antenna extending along the first direction;

the two first short-circuit connection posts are distributed on two sides of the first slot and are symmetrically arranged with respect to the first centerline, and the two second short-circuit connection posts are distributed on the two sides of the first slot and are symmetrically arranged with respect to the first centerline;

orthographic projections of the first short-circuit connection posts and the second short-circuit connection posts on the first dielectric substrate are not overlapped with orthographic projections of the first slot and the first conductive structure on the first dielectric substrate; orthographic projections of the first short-circuit connection structure and the second short-circuit connection structure on the first dielectric substrate are at least partially overlapped with an orthographic projection of the first slot on the first dielectric substrate.

12. The antenna according to claim 11, wherein there is no overlapped region between the orthographic projections of the first short-circuit connection structure and the second short-circuit connection structure on the first dielectric substrate and an orthographic projection of the first conductive structure on the first dielectric substrate.

13. The antenna according to claim 10, wherein shapes of the first short-circuit connection structure and the second short-circuit connection structure comprise rectangles; or, shapes of the first short-circuit connection structure and the second short-circuit connection structure comprise an I-shaped structure rotated by 90 degrees, wherein in a plane where the second feed layer is located, a rectangular first short-circuit connection structure and a rectangular second short-circuit connection structure have sizes from 1.5 mm to 2.1 mm in the first direction and from 0.3 mm to 0.7 mm in the second direction;

the I-shaped structure has a size of 1.5 mm to 2.1 mm in the first direction, the I-shaped structure comprises two end parts and an intermediate connection part connecting the two end parts, the two end parts of the I-shaped structure have sizes of 0.3 mm to 0.7 mm in the second direction; the intermediate connection part of the I-shaped structure has a size of 0.1 mm to 0.3 mm in the second direction and a size of 0.6 mm to 1 mm in the first direction.

14. The antenna according to claim 1, wherein a low frequency cut-off frequency of the antenna is calculated by the following formula:

$$f_{cutoff,lower} \approx \frac{c}{4.5(ll+h)\sqrt{\varepsilon_r}}$$

wherein, $f_{cutoff,lower}$ is the low frequency cut-off frequency of the antenna, c is a speed of light, ll is a size of each of the plurality of first conductive patches in the first direction, $\varepsilon_r$ is a dielectric constant of the second dielectric substrate, and h is a thickness of the second dielectric substrate, wherein a high frequency cut-off frequency of the antenna is calculated by the following formula:

$$f_{cutoff,upper} \approx \frac{c}{1.25 l_{s2}\sqrt{\varepsilon_r}}$$

wherein, $f_{cutoff,upper}$ is the high frequency cut-off frequency of the antenna, c is a speed of light, $\varepsilon_r$ is a dielectric constant of the second dielectric substrate, and $l_{s2}$ a size of the first slot in the second direction.

15. The antenna according to claim 1, wherein, a size of the first slot in the second direction is larger than a size of the second conductive structure in the second direction, the size of the second conductive structure in the second direction is larger than a size of the first conductive structure in the second direction, and a size of the second conductive structure in the first direction is larger than a size of the first conductive structure in the first direction; wherein the size of the second conductive structure in the second direction is a size of each of the two second conductive patches in the second direction, the size of the first conductive structure in the second direction is a size of each of the two first conductive patches in the second direction, and the size of the second conductive structure in the first direction is a distance between two edges of the two second conductive patches that are furthest apart along the first direction, and the size of the first conductive structure in the first direction is a distance between two edges of the two first conductive patches that are furthest apart along the first direction;

orthographic projections of the first conductive structure and the second conductive structure on the first dielectric substrate are not overlapped with an orthographic projection of the first slot on the first dielectric substrate;

in the first direction, a spacing between the two second conductive patches is greater than a spacing between the two first conductive patches, and the spacing between the two first conductive patches is greater than or equal to a size of the first slot in the first direction, wherein the first slot has a size of 0.4 mm to 0.8 mm in the first direction and a size of 4.5 mm to 6.5 mm in the second direction; each of the two first conductive patches has a size of 1 mm to 2 mm in the first direction and a size of 0.7 mm to 1.1 mm in the second direction; a spacing between the two first conductive patches in the first direction is 0.4 mm to 0.8 mm;

the size of the second conductive structure in the first direction is 2 mm to 3.1 mm, the size of the second conductive structure in the second direction is 3.1 mm to 4 mm, and a spacing between the two second conductive patches in the first direction is 0.8 mm to 1.2 mm;

thicknesses of the first dielectric substrate, the second dielectric substrate and the third dielectric substrate are all 0.2 mm to 0.5 mm, and thicknesses of the reference ground structure, the first conductive structure and the second conductive structure are all 0.01 mm to 0.03 mm.

16. An electronic device, comprising at least one antenna of claim 1.

* * * * *